US012621356B2

(12) United States Patent
Araumi et al.

(10) Patent No.: US 12,621,356 B2
(45) Date of Patent: May 5, 2026

(54) COMMUNICATION CONTROL SERVER, COMMUNICATION SYSTEM, AND COMMUNICATION CONTROL METHOD

(71) Applicants: Yuichi Araumi, Tokyo (JP); Hiroaki Nagatsuka, Kanagawa (JP); Tomoyuki Nozawa, Kanagawa (JP)

(72) Inventors: Yuichi Araumi, Tokyo (JP); Hiroaki Nagatsuka, Kanagawa (JP); Tomoyuki Nozawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 130 days.

(21) Appl. No.: 18/602,438

(22) Filed: Mar. 12, 2024

(65) Prior Publication Data

US 2024/0323240 A1     Sep. 26, 2024

(30) Foreign Application Priority Data

Mar. 23, 2023     (JP) ................................. 2023-046375

(51) Int. Cl.
| | |
|---|---|
| *H04L 65/1095* | (2022.01) |
| *G05D 1/698* | (2024.01) |
| *G05D 101/00* | (2024.01) |
| *G05D 105/30* | (2024.01) |
| *H04L 67/12* | (2022.01) |

(52) U.S. Cl.
CPC ....... *H04L 65/1095* (2022.05); *G05D 1/6987* (2024.01); *G05D 2101/22* (2024.01); *G05D 2105/34* (2024.01); *H04L 67/12* (2013.01)

(58) Field of Classification Search
CPC ... H04L 65/1095; H04L 67/12; G05D 1/6987; G05D 2105/34; G05D 2101/22
See application file for complete search history.

(56) References Cited

U.S. PATENT DOCUMENTS

| | | | |
|---|---|---|---|
| 2021/0075594 A1* | 3/2021 | Hassani ................. | G06Q 10/02 |
| 2023/0049850 A1* | 2/2023 | Someya ............. | G06Q 30/0281 |
| 2023/0308705 A1 | 9/2023 | Araumi et al. | |

(Continued)

FOREIGN PATENT DOCUMENTS

| | | |
|---|---|---|
| JP | 2019-005819 A | 1/2019 |
| JP | 2022-067781 A | 5/2022 |

(Continued)

OTHER PUBLICATIONS

Mhd Yamen Saraiji, et al., Fusion Full Body Surrogacy for Collaborative Communication, SIGGRAPH '18 Emerging Technologies, Aug. 12-16, 2018, Vancouber, BC, Canada.

*Primary Examiner* — Naeem Taslim Alam
(74) *Attorney, Agent, or Firm* — IPUSA, PLLC

(57) ABSTRACT
A communication control server includes circuitry to receive, from a first mobile apparatus, status information indicating a status of the first mobile apparatus currently communicating with a communication terminal as a communication destination of the communication terminal. The first mobile apparatus is movable in a real space and remotely operable by the communication terminal. The circuitry switches the communication destination of the communication terminal from the first mobile apparatus to a second mobile apparatus based on the status information. The second mobile apparatus is movable in the real space and remotely operable by the communication terminal.

19 Claims, 26 Drawing Sheets

(56)         References Cited

U.S. PATENT DOCUMENTS

2023/0390937 A1* 12/2023 Fukabori ............. G05D 1/0038
2024/0008111 A1*  1/2024 Thompson ........... H04W 76/14

FOREIGN PATENT DOCUMENTS

JP         2023-140159  A    10/2023
JP         2023-140160  A    10/2023
JP         2023-140161  A    10/2023

* cited by examiner

HEMISPHERICAL IMAGE (FRONT)

HEMISPHERICAL IMAGE (BACK)

CAPTURED IMAGE (EQUIRECTANGULAR PROJECTION IMAGE EC)

SPHERICAL IMAGE CE

EQUIRECTANGULAR PROJECTION IMAGE EC

VIRTUAL
CAMERA IC

SPHERE CS

PREDETERMINED-AREA IMAGE Q
(PREDETERMINED AREA T)

VIRTUAL
CAMERA IC

SPHERE CS

PREDETERMINED-AREA IMAGE Q'
(PREDETERMINED AREA T')

FIG. 15

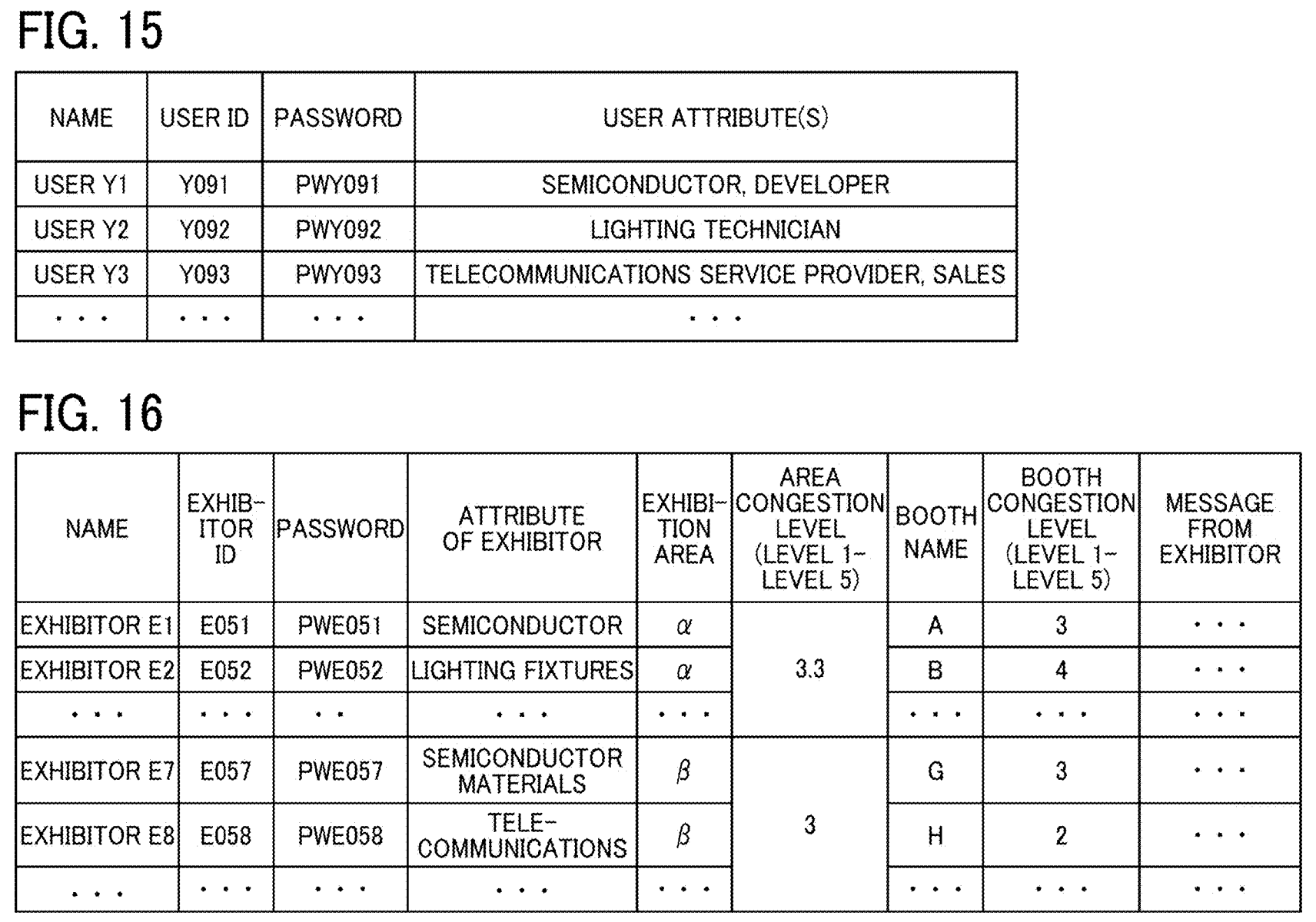

| NAME | USER ID | PASSWORD | USER ATTRIBUTE(S) |
|---|---|---|---|
| USER Y1 | Y091 | PWY091 | SEMICONDUCTOR, DEVELOPER |
| USER Y2 | Y092 | PWY092 | LIGHTING TECHNICIAN |
| USER Y3 | Y093 | PWY093 | TELECOMMUNICATIONS SERVICE PROVIDER, SALES |
| ... | ... | ... | ... |

FIG. 16

| NAME | EXHIB-ITOR ID | PASSWORD | ATTRIBUTE OF EXHIBITOR | EXHIBI-TION AREA | AREA CONGESTION LEVEL (LEVEL 1~ LEVEL 5) | BOOTH NAME | BOOTH CONGESTION LEVEL (LEVEL 1~ LEVEL 5) | MESSAGE FROM EXHIBITOR |
|---|---|---|---|---|---|---|---|---|
| EXHIBITOR E1 | E051 | PWE051 | SEMICONDUCTOR | α | 3.3 | A | 3 | ... |
| EXHIBITOR E2 | E052 | PWE052 | LIGHTING FIXTURES | α | | B | 4 | ... |
| ... | ... | ... | ... | ... | | ... | ... | ... |
| EXHIBITOR E7 | E057 | PWE057 | SEMICONDUCTOR MATERIALS | β | 3 | G | 3 | ... |
| EXHIBITOR E8 | E058 | PWE058 | TELE-COMMUNICATIONS | β | | H | 2 | ... |
| ... | ... | ... | ... | ... | | ... | ... | ... |

FIG. 17

| NAME | ROBOT ID | PASSWORD | ICON IMAGE | LATEST POSITION IN REAL SPACE | LATEST POSITION IN VIRTUAL SPACE | USER ID OF USER REMOTELY OPERATING |
|------|----------|----------|------------|-------------------------------|----------------------------------|-------------------------------------|
| ROBOT R11 | R011 | PWR011 | [11] | $(X11, Y11)$ | $(x11, y11)$ | Y091 |
| ROBOT R12 | R012 | PWR012 | [12] | $(X12, Y12)$ | $(x12, y12)$ | |
| ROBOT R13 | R013 | PWR013 | [13] | $(X13, Y13)$ | $(x13, y13)$ | |
| ROBOT R14 | R014 | PWR014 | [14] | $(X14, Y14)$ | $(x14, y14)$ | |
| ROBOT R21 | R021 | PWR021 | [21] | $(X21, Y21)$ | $(x21, y21)$ | |
| ROBOT R22 | R022 | PWR022 | [22] | $(X22, Y22)$ | $(x22, y22)$ | Y092 |
| ROBOT R23 | R023 | PWR023 | [23] | $(X23, Y23)$ | $(x23, y23)$ | |
| ROBOT R24 | R024 | PWR024 | [24] | $(X24, Y24)$ | $(x24, y24)$ | |
| ⋮ | ⋮ | ⋮ | ⋮ | ⋮ | ⋮ | ⋮ |

FIG. 18

| EXHIBITION AREA | NAME | ROBOT ID | BOOTH AT INITIAL POSITION | EXHIBITOR AT INITIAL POSITION | ATTRIBUTE OF EXHIBITOR | RESERVATION TIME SLOT (USER ID) | | | | | | REFERENCE INFORMATION |
|---|---|---|---|---|---|---|---|---|---|---|---|---|
| | | | | | | 9:00 | 10:00 | 11:00 | 12:00 | ··· | | |
| α | ROBOT R11 | R011 | A | EXHIBITOR E1 | SEMICONDUCTOR | Y091 | Y091 | | | | | FULL-SPHERE CAPTURE CAPABILITY |
| | ROBOT R12 | R012 | B | EXHIBITOR E2 | LIGHTING FIXTURES | Y091 | Y091 | | | | | FULL-SPHERE CAPTURE CAPABILITY |
| | ROBOT R13 | R013 | D | EXHIBITOR E3 | LIGHTING FIXTURES | Y091 | Y091 | | | | | HIGH-SPEED MOVEMENT CAPABILITY |
| | ROBOT R14 | R014 | F | EXHIBITOR E4 | SEMICONDUCTOR | | | Y093 | | | | FULL-SPHERE CAPTURE CAPABILITY |
| β | ROBOT R21 | R021 | G | EXHIBITOR E5 | SOFTWARE | | | | | | | |
| | ROBOT R22 | R022 | H | EXHIBITOR E6 | SOFTWARE | Y092 | Y092 | | | | | |
| | ROBOT R23 | R023 | J | EXHIBITOR E7 | SEMICONDUCTOR MATERIALS | Y092 | Y092 | | | | | HIGH-SPEED MOVEMENT CAPABILITY |
| | ROBOT R24 | R024 | K | EXHIBITOR E8 | TELE-COMMUNICATIONS | | | | Y093 | | | FULL-SPHERE CAPTURE CAPABILITY |
| ··· | ··· | ··· | ··· | ··· | | ··· | ··· | ··· | ··· | | | ··· |

| NAME | ROBOT ID | TYPE OF IMAGING DEVICE | MAXIMUM MOVEMENT SPEED (LEVEL 1– LEVEL 5) | AMOUNT OF BATTERY REMAINING (%) | COMMUNICA-TION STATUS (LEVEL 1– LEVEL 5) | TOTAL OPERATION TIME (MINUTES) | MALFUNCTION STATUS (LEVEL 0– LEVEL 2) |
|------|----------|------------------------|----------|----|----|-----|----|
| ROBOT R11 | R011 | FULL-SPHERE CAPTURE | 3 | 30 | 4 | 700 | 0 |
| ROBOT R12 | R012 | FULL-SPHERE CAPTURE | 3 | 50 | 5 | 500 | 0 |
| ROBOT R13 | R013 | REGULAR CAPTURE | 4 | 90 | 3 | 100 | 1 |
| · · · | · · · | · · · | · · · | · · · | · · · | · · · | · · · |

Figure 21:
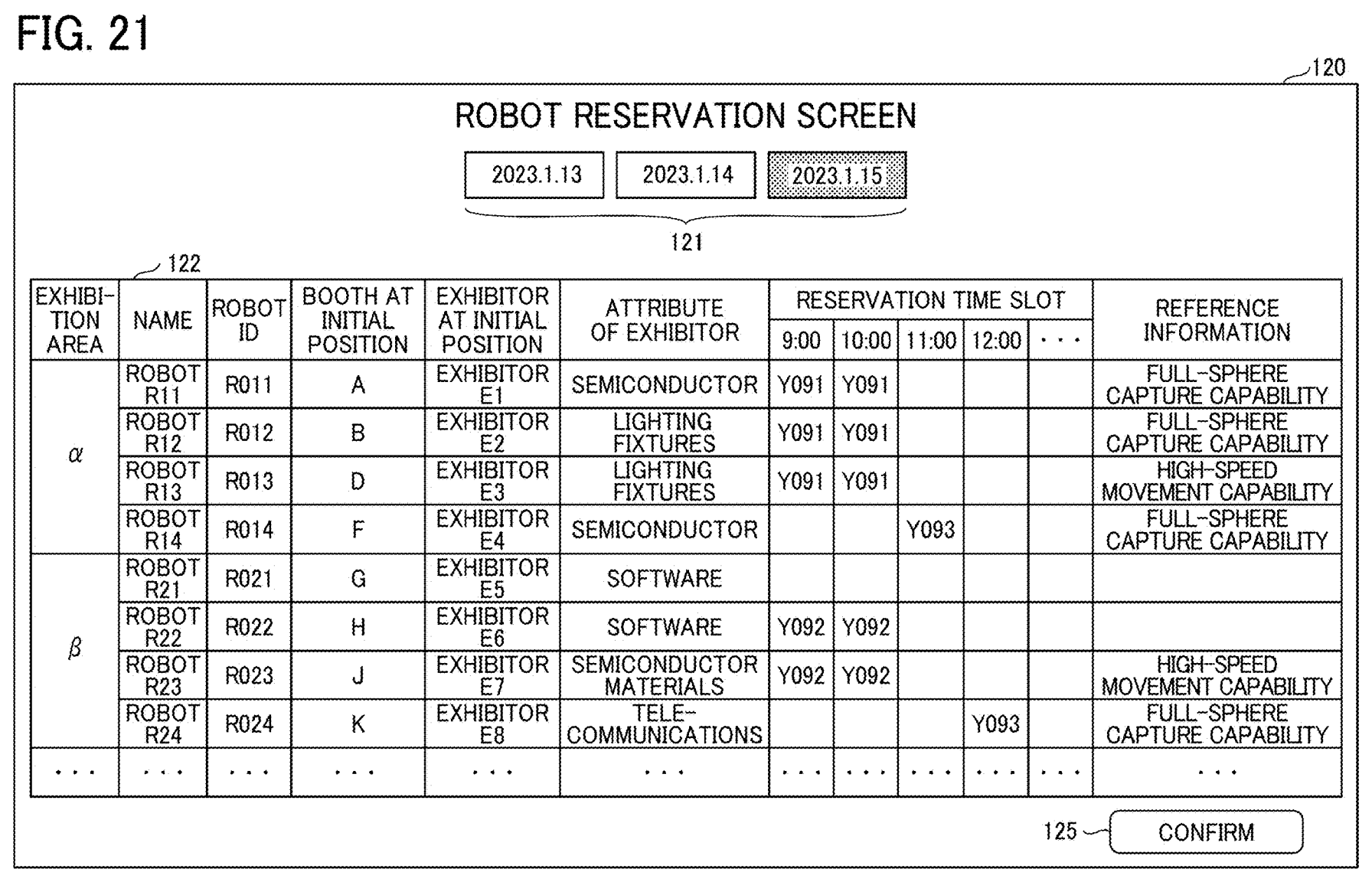

ROBOT RESERVATION SCREEN

| 2023.1.13 | 2023.1.14 | 2023.1.15 |

| EXHIBI-TION AREA | NAME | ROBOT ID | BOOTH AT INITIAL POSITION | EXHIBITOR AT INITIAL POSITION | ATTRIBUTE OF EXHIBITOR | RESERVATION TIME SLOT | | | | | REFERENCE INFORMATION |
|---|---|---|---|---|---|---|---|---|---|---|---|
| | | | | | | 9:00 | 10:00 | 11:00 | 12:00 | · · · | |
| α | ROBOT R11 | R011 | A | EXHIBITOR E1 | SEMICONDUCTOR | Y091 | Y091 | | | | FULL-SPHERE CAPTURE CAPABILITY |
| | ROBOT R12 | R012 | B | EXHIBITOR E2 | LIGHTING FIXTURES | Y091 | Y091 | | | | FULL-SPHERE CAPTURE CAPABILITY |
| | ROBOT R13 | R013 | D | EXHIBITOR E3 | LIGHTING FIXTURES | Y091 | Y091 | | | | HIGH-SPEED MOVEMENT CAPABILITY |
| | ROBOT R14 | R014 | F | EXHIBITOR E4 | SEMICONDUCTOR | | | Y093 | | | FULL-SPHERE CAPTURE CAPABILITY |
| β | ROBOT R21 | R021 | G | EXHIBITOR E5 | SOFTWARE | | | | | | |
| | ROBOT R22 | R022 | H | EXHIBITOR E6 | SOFTWARE | Y092 | Y092 | | | | |
| | ROBOT R23 | R023 | J | EXHIBITOR E7 | SEMICONDUCTOR MATERIALS | Y092 | Y092 | | | | HIGH-SPEED MOVEMENT CAPABILITY |
| | ROBOT R24 | R024 | K | EXHIBITOR E8 | TELE-COMMUNICATIONS | | | | Y093 | | FULL-SPHERE CAPTURE CAPABILITY |
| · · · | · · · | · · · | · · · | · · · | · · · | | | | | · · · | · · · |

CONFIRM

COMMUNICATION CONTROL SERVER, COMMUNICATION SYSTEM, AND COMMUNICATION CONTROL METHOD

CROSS-REFERENCE TO RELATED APPLICATIONS

This patent application is based on and claims priority pursuant to 35 U.S.C. § 119(a) to Japanese Patent Application No. 2023-046375, filed on Mar. 23, 2023, in the Japan Patent Office, the entire disclosure of which is hereby incorporated by reference herein.

BACKGROUND

Technical Field

Embodiments of the present disclosure relate to a communication control server, a communication system, and a communication control method.

Related Art

In an exhibition hall in a real space, there is a tour in which an exhibitor tours the exhibition hall together with a telepresence robot. The telepresence robot is referred to as a robot in the following. In the related art, a user who desires to remotely observe an exhibition hall can observe the exhibition hall from a remote site, with, for example, his or her personal computer (PC) through a communication network, by viewing a video from a camera mounted on a robot or listening to voice of an exhibitor from a microphone mounted on the robot.

Further, in order to cover various exhibition halls, some technologies to remotely operate multiple robots by switching the robots by a single user are known. In the related art, when a first robot reaches a predetermined position (switching point) on a travel path in a real space, the first robot can be switched to a second robot.

SUMMARY

According to one or more embodiments, a communication control server includes circuitry to receive, from a first mobile apparatus, status information indicating a status of the first mobile apparatus currently communicating with a communication terminal as a communication destination of the communication terminal. The first mobile apparatus is movable in a real space and remotely operable by the communication terminal. The circuitry switches the communication destination of the communication terminal from the first mobile apparatus to a second mobile apparatus based on the status information. The second mobile apparatus is movable in the real space and remotely operable by the communication terminal.

According to one or more embodiments, a communication system includes a first mobile apparatus to move in a real space, a second mobile apparatus to move in the real space, a communication terminal to remotely operate one of the first mobile apparatus and the second mobile apparatus, and a communication control server to control communication between the communication terminal and each of the first mobile apparatus and the second mobile apparatus. The communication control server includes circuitry to receive, from the first mobile apparatus, status information indicating a status of the first mobile apparatus currently communicating with the communication terminal as a communication destination of the communication terminal and switch the communication destination of the communication terminal from the first mobile apparatus to the second mobile apparatus based on the status information indicating that the status of the first mobile apparatus is a predetermined status.

According to one or more embodiments, a communication control method includes receiving, from a first mobile apparatus, status information indicating a status of the first mobile apparatus currently communicating with a communication terminal as a communication destination of the communication terminal. The first mobile apparatus is movable in a real space and remotely operable by the communication terminal. The method includes switching the communication destination of the communication terminal from the first mobile apparatus to a second mobile apparatus based on the status information indicating that the status of the first mobile apparatus is a predetermined status. The second mobile apparatus is movable in the real space and remotely operable by the communication terminal.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 2 is a diagram illustrating a situation of an exhibition hall in a real space according to some embodiments of the present disclosure;

FIG. 3 is a block diagram illustrating a hardware configuration of a communication control server according to some embodiments of the present disclosure;

FIG. 15 is a conceptual diagram illustrating a user management table according to some embodiments of the present disclosure;

FIG. 16 is a conceptual diagram illustrating an exhibitor management table according to some embodiments of the present disclosure;

FIG. 17 is a conceptual diagram illustrating a robot position management table according to some embodiments of the present disclosure;

FIG. 18 is a conceptual diagram illustrating a robot reservation management table according to some embodiments of the present disclosure;

FIG. 19 is a conceptual diagram illustrating a robot performance/status management table according to some embodiments of the present disclosure;

FIG. 20 is a sequence diagram illustrating a process for reserving a robot, managing a situation of a booth, and managing a position of a robot in a real space according to some embodiments of the present disclosure;

FIG. 21 is a diagram illustrating a robot reservation screen displayed on a user terminal according to some embodiments of the present disclosure;

Figure 1:
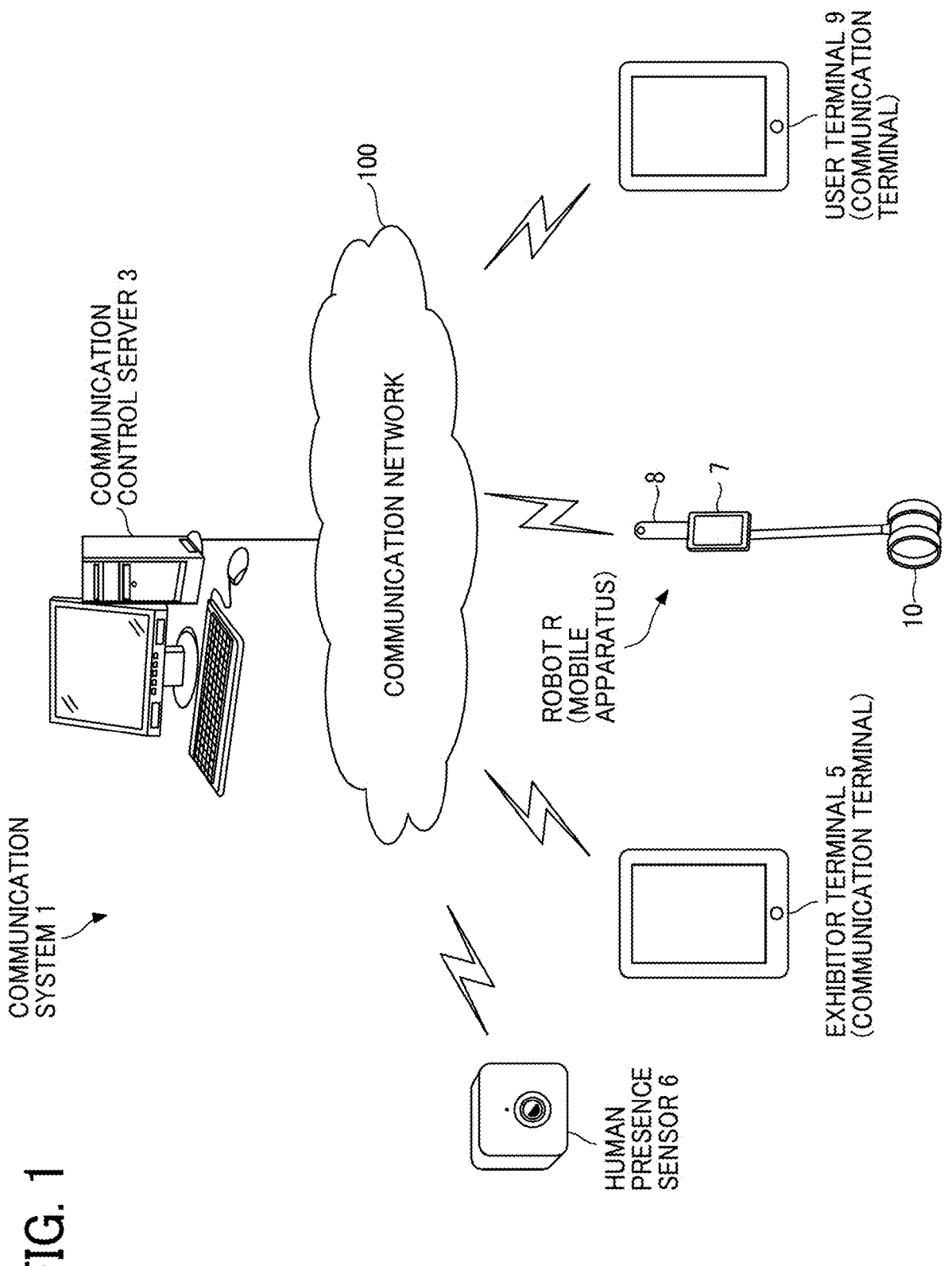
FIG. 1 is a diagram illustrating an overview of a communication system according to some embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Overview of Communication System

An overview of a communication system 1 according to a present embodiment is described with reference to FIG. 1. FIG. 1 is a diagram illustrating an overall configuration of a communication system using a telepresence robot R (in the following description of the present embodiment, the telepresence robot R is referred to as a "robot R").

The communication system 1 includes a communication control server 3, an exhibitor terminal 5, a human presence sensor 6, a user terminal 9, and the robot R. In FIG. 1, one exhibitor terminal 5, one human presence sensor 6, one user terminal 9, and one robot R are illustrated due to the limitation of the drawing, but multiple exhibitor terminals 5, multiple human presence sensors 6, multiple user terminals 9, and multiple robots R are present in actual operation.

The robot R includes a robot terminal 7, a wide-angle imaging device 8, and a vehicle device 10 that allows the robot R to move. The robot R according to the present embodiment basically travels autonomously. In some embodiments, the robot R may not autonomously travel. The robot R is an example of a mobile apparatus that is movable in a real space, and the mobile apparatus includes a device that moves in the air, such as a drone, and a device that moves in water, such as a submarine type radio control device. The vehicle device 10 is an example of a propulsion device.

The robot R may move underground, in a narrow passage, or subterranean. Further, when the robot R moves on the land, the robot may move not only by one or more wheels but also by multiple legs such as two legs, three legs, or four legs, or may move by CATERPILLAR (registered trademark).

Further, the robot R is a robot that is not fixed. The robot that is not fixed includes a mobile-type robot that has a drive unit for moving by, for example, one or more wheels and a wearable-type robot that is wearable by a person and has a drive unit for operation of, for example, a manipulator.

The mobile-type robot includes a robot that travels by a single wheel or two or more wheels, a robot that travels by a caterpillar, a robot that travels on a rail, a robot that jumps to move, a robot that walks with two feet, four feet, or multiple feet, a robot that sails on or in water by a screw, and a robot that flies by, for example, a propeller. The wearable-type robot includes a robot that is disclosed in, for example, Reference Document 1.

Reference Document 1: MHD Yamen Saraiji, Tomoya Kanki Sasaki, Reo Matsumura, Kouta Minamizawa and Masahiko Inami, "Fusion: full body surrogacy for collaborative communication," Proceeding SIGGRAPH '18 ACM SIGGRAPH 2018 Emerging Technologies Article No. 7.

The above-described reference is hereby incorporated by reference herein.

Further, the robot R includes a robot including a camera. Such a robot can be installed in, for example, a sports stadium and can move on a rail in the sports stadium. Further, the robot R includes a satellite-type robot launched into space, and such a robot can control the posture and the imaging direction of a camera. Further, the robot R may be a so-called telepresence robot or avatar robot.

The robot R is provided with an environmental sensor such as a temperature sensor, a humidity sensor, an oxygen sensor, or a carbon dioxide sensor, and is also provided with, for example, a lighting device for illuminating the surroundings of the robot R.

The communication control server 3, the exhibitor terminal 5, the human presence sensor 6, the user terminal 9, and the robot terminal 7 of the robot R can communicate with each other via a communication network 100 such as a local area network (LAN) or the Internet. The communication may be wired communication or wireless communication. In FIG. 1, the exhibitor terminal 5, the human presence sensor 6, the user terminal 9, and the robot terminal 7 are illustrated to communicate wirelessly. The human presence sensor 6 may be connected to a communication network via the exhibitor terminal 5 by pairing with the exhibitor terminal 5. Each of the exhibitor terminal 5 and the user terminal 9 serves as a communication terminal.

The communication control server 3 may include multiple servers. In this case, databases (DBs) 41 to 45 may be implemented in a distributed manner across the multiple servers.

Situation in Real Space

Figure 2:
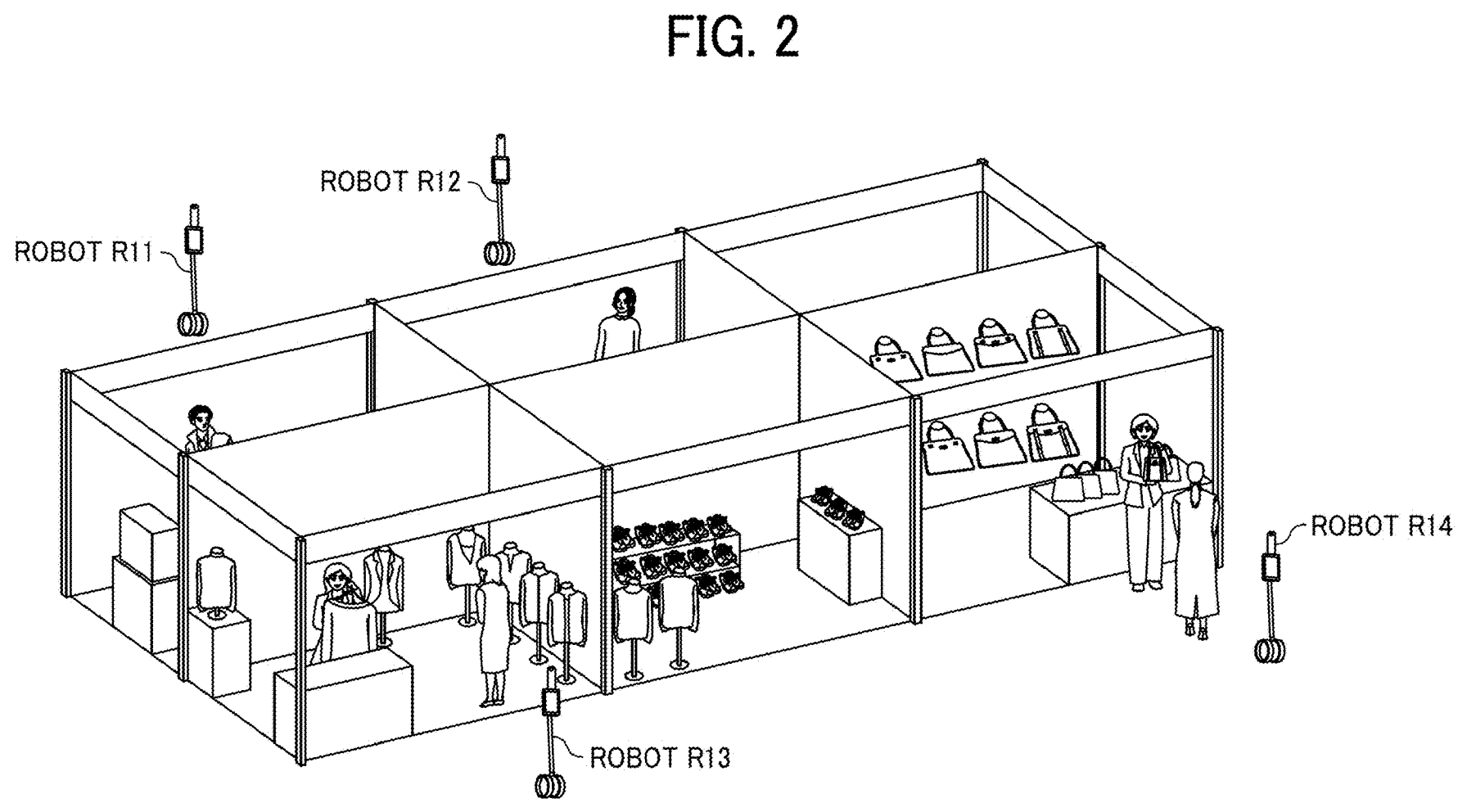

A situation in a real space is described below with reference to FIG. 2. FIG. 2 is a diagram illustrating a situation of an exhibition hall in a real space according to the present embodiment. An area α of the exhibition hall is described with reference to FIG. 2, but the present disclosure is not limited thereto. In FIG. 2, exhibitors E exhibit in six booths.

In the area α of the exhibition hall, robots R11, R12, R13, and R14 serving as robots R are positioned. The robot R includes the robot terminal 7, the wide-angle imaging device 8, and the vehicle device 10. In some cases, the robot R may be provided with an imaging device such as a typical digital camera instead of the wide-angle imaging device 8. The data of the video and the sound obtained by the wide-angle imaging device 8 of the robot R is transmitted by the robot terminal 7 to the user terminal 9 of a user Y who is remotely operating the robot R. The user Y remotely operates the robot R in consideration of the video and the sound, and a user operation of the user Y can cause the vehicle device 10 to drive the robot R to move (including rotation). Accordingly, the user Y can have a simulated experience as if he or she were at the exhibition hall while being, for example, at home or in a company without going to the exhibition hall.

Further, for example, while a single user is remotely operating the robot R11, the user can switch to the robot R12 reserved in advance and remotely operate the robot R12.

Each exhibitor E can use the exhibitor terminal 5. Further, the human presence sensor 6 is installed in each booth, and the communication control server 3 acquires, from each human presence sensor 6, headcount information indicating the number of people in the booth and the number of people around the booth and manages congestion in each booth or the entire area.

Further, each exhibitor E has the exhibitor terminal 5, and sends a message relating to, for example, a congestion situation (crowded situation) or an event relating to his or her booth to each of the remote users Y via the communication control server 3.

Hardware Configuration

A hardware configuration of each of a server and a terminal included in the communication system 1 is described below, with reference to FIGS. 3 to 13.

Hardware Configuration of Communication System

Figure 3:
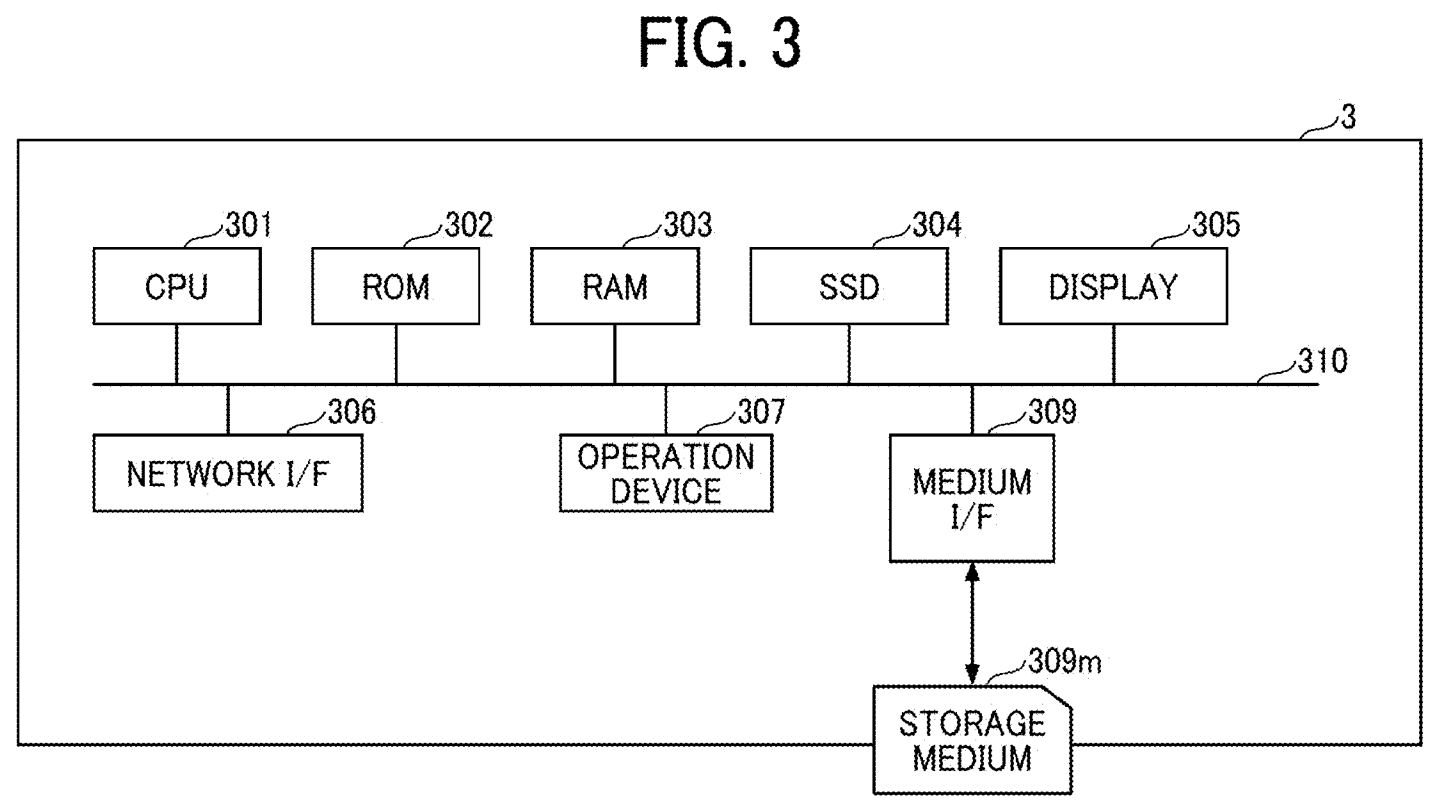

FIG. 3 is a block diagram illustrating a hardware configuration of a communication control server according to the present embodiment.

As illustrated in FIG. 3, the communication control server 3 has a configuration of a general-purpose computer, and includes, for example, a central processing unit (CPU) 301, a read-only memory (ROM) 302, a random-access memory (RAM) 303, a solid-state drive (SSD) 304, a display 305, a network interface (I/F) 306, an operation device 307, a medium I/F 309, and a bus line 310. In alternative to the SSD, a hard disk drive (HDD) may be used.

The CPU 301 is, for example, an arithmetic device that reads out programs or data from the ROM 302 or the SSD 304, and executes processing according to the programs or data to implement the functions of the communication control server 3. The ROM 302 is a nonvolatile memory in which a program used for starting the CPU 301 such as an initial program loader (IPL) is stored in advance. The RAM 303 is a volatile memory used as, for example, a working area for the CPU 301.

The SSD 304 is a storage device that stores, for example, an operating system (OS), application programs, and various types of information. The display 305 is a display device that displays various types of information such as a cursor, a menu, a window, characters, or an image.

The network I/F 306 is a communication interface for data communication using the communication network 100. The operation device 307 includes, for example, a keyboard and a pointing device, and serves as an input unit for receiving an input operation for inputting, for example, characters, numerical values, or various instructions.

The medium I/F 309 controls, for example, reading and writing (storing) data from or to a recording medium 309$m$ such as a memory card. The bus line 310 is an address bus or a data bus, which electrically connects the components illustrated in FIG. 3, such as the CPU 301, to each other.

Hardware of Exhibitor Terminal, Robot Terminal, and User Terminal

Figure 4:
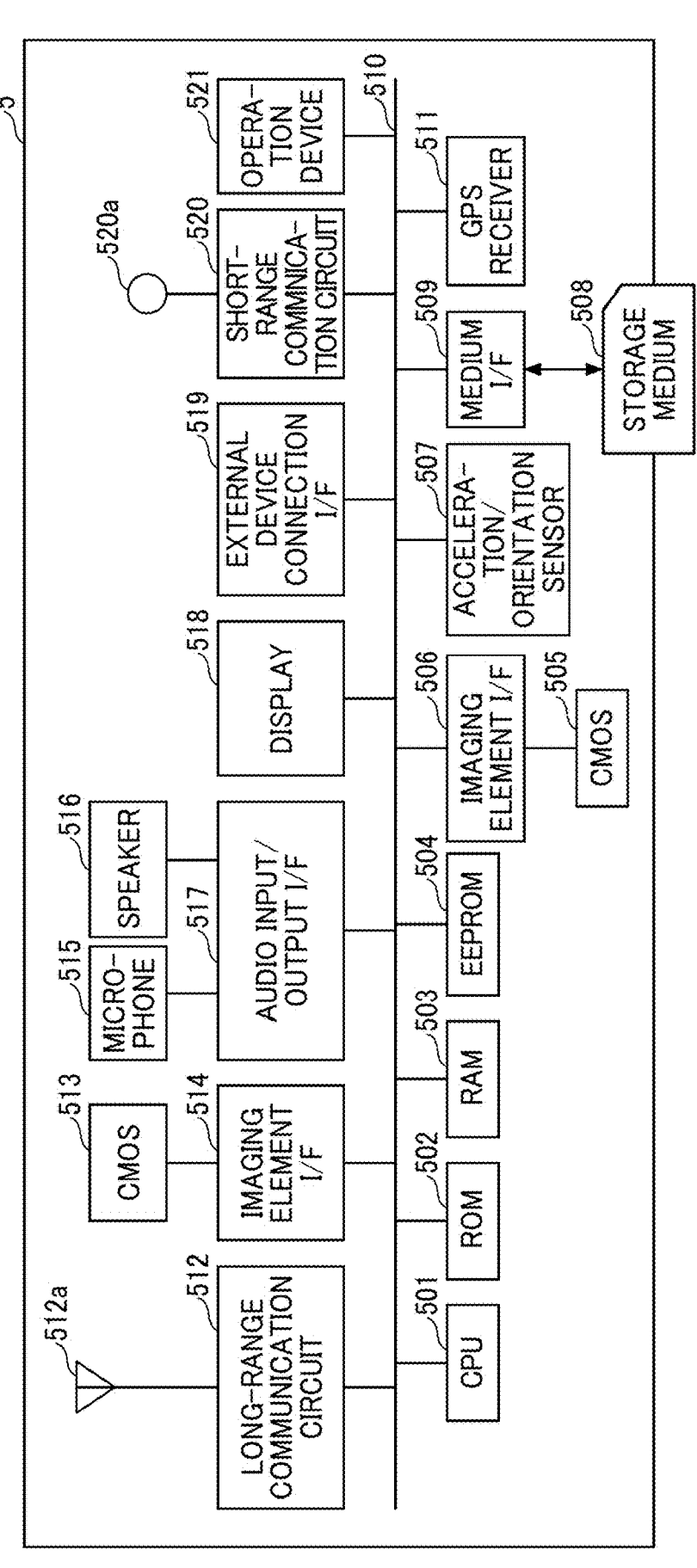
FIG. 4 is a block diagram illustrating a hardware configuration of each of an exhibitor terminal, a robot terminal, and a user terminal according to some embodiments of the present disclosure.

FIG. 4 is a block diagram illustrating a hardware configuration of each of an exhibitor terminal, a robot terminal, and a user terminal according to the present embodiment. The exhibitor terminal 5, the robot terminal 7, and the user terminal 9 are computers having the same hardware configurations, and thus the exhibitor terminal 5 is used to describe the hardware configuration below.

As illustrated in FIG. 4, the exhibitor terminal 5 includes a CPU 501, a ROM 502, a RAM 503, an electrically erasable programmable read-only memory (EEPROM) 504, a complementary metal oxide semiconductor (CMOS) sensor 505, an imaging element I/F 506, an acceleration/orientation sensor 507, a medium I/F 509, and a global positioning system (GPS) receiver 511.

The CPU 501 controls the entire operation of the exhibitor terminal 5. The ROM 502 stores programs, such as an IPL, used for driving the CPU 501. The RAM 503 is used as a working area for the CPU 501. The EEPROM 504 reads or writes various data such as a control program for exhibitor terminals under the control of the CPU 501. The CMOS sensor 505 serves as a built-in imaging device that captures an object (for example, a self-image of a user) under the control of the CPU 501 and obtains image data. In alternative to the CMOS sensor, an imaging element such as a charge-coupled device (CCD) sensor may be used. The imaging element I/F 506 is a circuit that controls driving of the CMOS sensor 505. The acceleration/orientation sensor 507 includes various sensors such as an electromagnetic compass for detecting geomagnetism, a gyrocompass, and an acceleration sensor. The medium I/F 509 controls reading and writing (storing) data from or to a recording medium 508 such as a flash memory. The GPS receiver 511 receives a GPS signal from a GPS satellite. The GPS receiver 511 can also receive a signal, such as an indoor messaging system (IMES), indicating an indoor position.

The exhibitor terminal 5 further includes a long-range communication circuit 512, a CMOS sensor 513, an imaging element I/F 514, a microphone 515, a speaker 516, an audio input/output I/F 517, a display 518, an external device connection I/F 519, a short-range communication circuit 520, an antenna 520a for the short-range communication circuit 520, and an operation device 521.

The long-range communication circuit 512 is a circuit to communicate with another device through the communication network 100. The CMOS sensor 513 serves as a built-in imaging device that captures an object under the control of the CPU 501 and obtains image data. The imaging element I/F 514 is a circuit that controls driving of the CMOS sensor 513. The microphone 515 is a built-in circuit that converts sound into electrical signals. The speaker 516 is a built-in circuit that generates sound such as music or voice by converting an electrical signal into physical vibration. The audio input/output I/F 517 is a circuit for inputting and outputting audio signals between the microphone 515 and the speaker 516 under the control of the CPU 501. The display 518 serves as a display device that displays an image of an object, various icons, etc. Examples of the display 518 include, but are not limited to, a liquid crystal display (LCD) and an organic electroluminescence (EL) display. The external device connection I/F 519 is an interface for connecting to various external devices. The short-range communication circuit 520 is a communication circuit that operates according to standards such as Wi-Fi, near field communication (NFC), or BLUETOOTH (registered trademark). The operation device 521 includes, for example, a touch panel, and serves as an input unit for receiving an input operation for inputting, for example, characters, numerical values, or various instructions.

The exhibitor terminal 5 includes the bus line 510. The bus line 510 includes an address bus and a data bus and electrically connects the components illustrated in FIG. 4, such as the CPU 401, to each other.

Further, the EEPROM 504 of the robot terminal 7 stores a program for detecting a malfunction of the robot terminal 7 or the wide-angle imaging device 8. When a typical imaging device is attached to the robot R instead of the wide-angle imaging device 8, a malfunction of the typical imaging device can be detected.

Hardware Configuration of Human Presence Sensor

Figure 5:
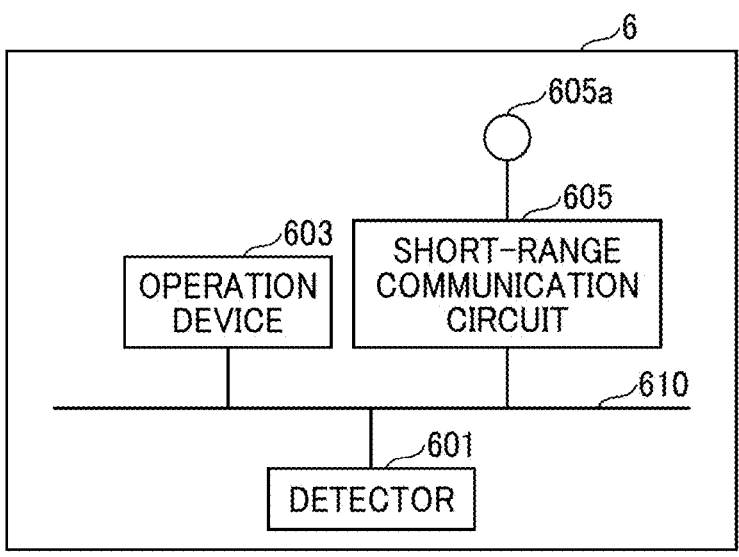
FIG. 5 is a block diagram illustrating a hardware configuration of a human presence sensor according to some embodiments of the present disclosure.

FIG. 5 is a block diagram illustrating a hardware configuration of a human presence sensor according to the present embodiment.

As illustrated in FIG. 5, the human presence sensor 6 includes a detector 601, an operation device 603, a short-range communication circuit 605, an antenna 605a for the short-range communication circuit 605, and a bus line 610.

The detector 601 is a circuit that detects people by sensing the infrared radiation emitted by humans.

The operation device 603 includes, for example, a switch and a button, and serves as an input unit that allow users to input, for example, various settings or data such as an identifier (ID). Further, data such as an ID is stored in a cache memory in the operation device 603.

The short-range communication circuit 605 is a communication circuit that operates according to standards such as Wi-Fi, near field communication (NFC), or BLUETOOTH (registered trademark).

The bus line 610 includes an address bus and a data bus and electrically connects the components illustrated in FIG. 5, such as the detector 601, to each other.

Hardware Configuration of Wide-Angle Imaging Device

Figure 6:
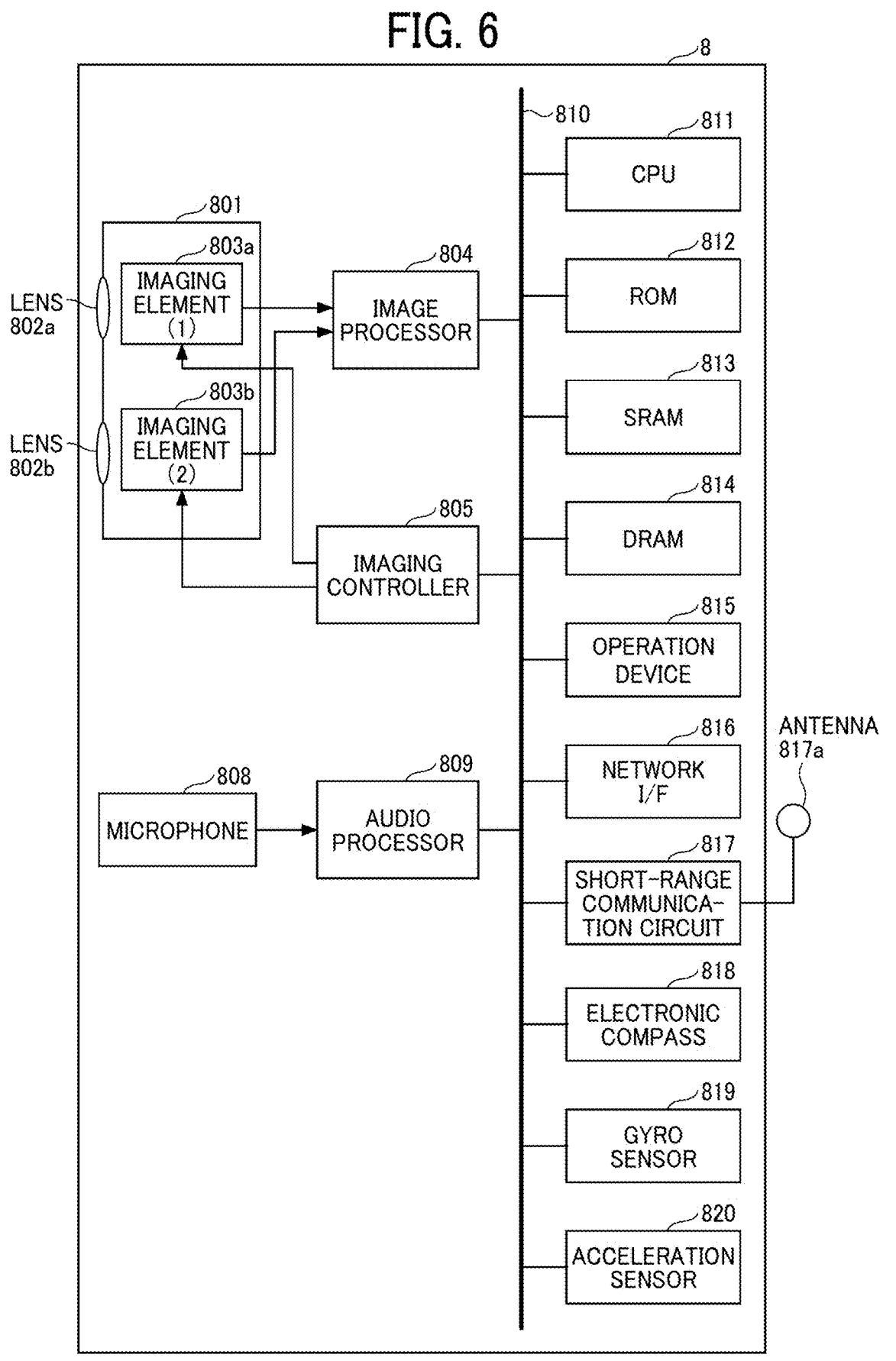
FIG. 6 is a block diagram illustrating a hardware configuration of a wide-angle imaging device according to some embodiments of the present disclosure.

Referring to FIG. 6, a hardware configuration of the wide-angle imaging device 8 is described. FIG. 6 is a block diagram illustrating a hardware configuration of the wide-angle imaging device 8 according to the present embodiment. In the following description of the present embodiment, the wide-angle imaging device 8 that is a spherical (omnidirectional) imaging device having two imaging elements is used. In some embodiments, the wide-angle imaging device 8 can include more than two imaging elements. Further, the wide-angle imaging device 8 is not necessarily a device dedicated to omnidirectional imaging, and an external omnidirectional imaging unit may be attached to a typical digital camera or a smartphone to implement an imaging device having substantially the same function as that of the wide-angle imaging device 8 according to the present embodiment.

As illustrated in FIG. 6, the wide-angle imaging device 8 is also connected to an imaging unit 801, an image processor 804, an imaging controller 805, a microphone 808, an audio processor 809, a CPU 811, a ROM 812, a static random-access memory (SRAM) 813, a dynamic random-access memory (DRAM) 814, an operation device 815, a network I/F 816, a short-range communication circuit 817, an antenna 817a for the short-range communication circuit 817, an electronic compass 818, a gyroscopic sensor 819, and an acceleration sensor 820.

The imaging unit 801 includes two wide-angle lenses (so-called fisheye lenses) 802a and 802b, each having an angle of view of equal to or greater than 180 degrees to form a hemispherical image. The imaging unit 801 further includes two imaging elements 803a and 803b corresponding to the wide-angle lenses 802a and 802b respectively. Each of the imaging elements 803a and 803b includes an imaging sensor such as a CMOS sensor and a CCD sensor, a timing generation circuit, and a group of registers. The imaging sensor converts an optical image formed by the fisheye lenses 802a and 802b into electrical signals to output image data. The timing generation circuit generates horizontal or vertical synchronization signals and pixel clocks for the imaging sensor. Various commands and parameters for operations of the imaging elements 803a and 803b are set in the group of registers.

Each of the imaging elements 803a and 803b of the imaging unit 801 is connected to the image processor 804 through a parallel I/F bus. Further, each of the imaging elements 803a and 803b of the imaging unit 801 is connected to the image controller 805 through a serial I/F bus such as an inter-integrated circuit (I2C) bus. The image processor 804, the imaging controller 805, and the audio processor 809 are connected to the CPU 811 via a bus 810. Further, the ROM 812, the SRAM 813, the DRAM 814, the operation device 815, the network I/F 816, the short-range communication circuit 817, and the electronic compass 818 are also connected to the bus 810.

Figure 8A:
FIG. 8A is a diagram illustrating a hemispherical image (front side) captured by a wide-angle imaging device according to some embodiments of the present disclosure.
Figure 8B:
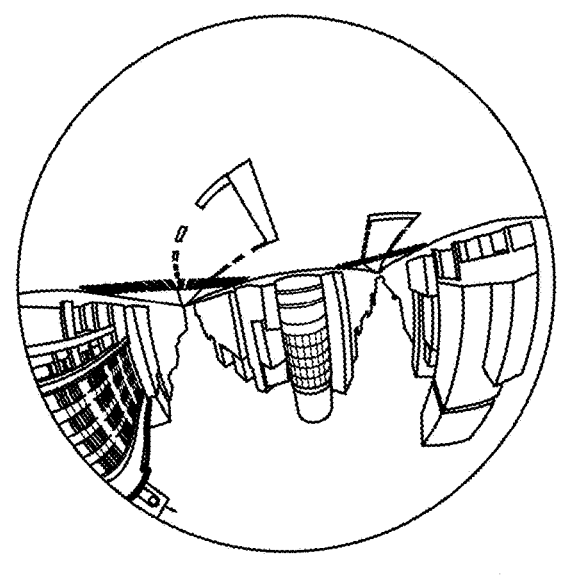
FIG. 8B is a diagram illustrating a hemispherical image (back side) captured by a wide-angle imaging device according to some embodiments of the present disclosure.
Figure 8C:
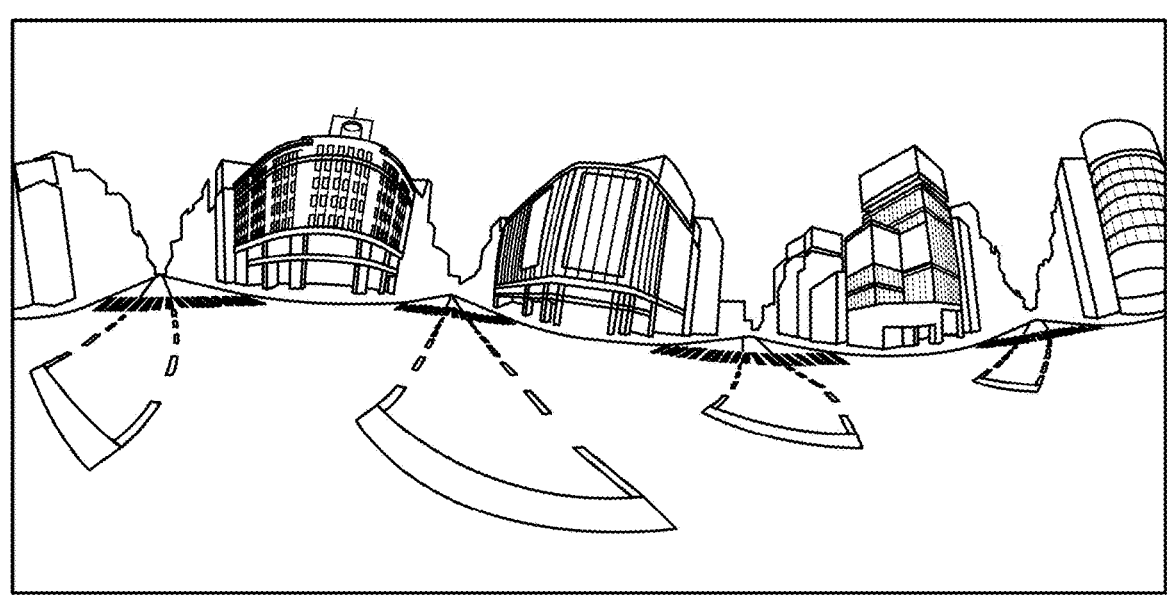
FIG. 8C is a view illustrating an image obtained by an equirectangular projection, which is referred to as an "equirectangular projection image" (or equidistant cylindrical projection image) according to some embodiments of the present disclosure.

The image processor 804 acquires image data from each of the imaging elements 803a and 803b via the parallel I/F bus and performs predetermined processing on the image data. Subsequently, the image processor 804 combines the image data to generate data of an equirectangular projection image as illustrated in FIG. 8C.

The image controller 805 typically serves as a master device while each of the imaging elements 803a and 803b serves as a slave device, and the image controller 805 sets commands in a group of registers of each of the imaging elements 803a and 803b through an Inter-Integrated Circuit (I2C) bus. The image controller 805 receives various commands to be used from the CPU 811. In addition, the image controller 805 obtains status data of a group of registers of each of the imaging elements 803a and 803b through the I2C bus and transmits the status data to the CPU 811.

The image controller 805 instructs the imaging elements 803a and 803b to output the image data at a time when a shutter button of the operation device 815 is pressed. The wide-angle imaging device 8 may have a preview display function or a moving image display function. In the case of displaying a moving image, the image data is continuously output from the imaging elements 803a and 803b at a predetermined frame rate (frames per minute).

The imaging controller 805 further serves as a synchronization control unit operating in conjunction with the CPU 811 as described later, to synchronize the output timings of the image data between the imaging elements 803a and 803b. In the present embodiment, the wide-angle imaging device 8 is not provided with a display. In some embodiments, the wide-angle imaging device 8 may be provided with a display.

The microphone 808 converts recorded voice into voice data. The audio processor 809 obtains the voice data from the microphone 808 through an I/F bus and performs predetermined processing on the voice data.

The CPU 811 controls the entire operation of the wide-angle imaging device 8 and executes processing that is intended to be executed. The ROM 812 stores various programs to be executed by the CPU 811. Each of the SRAM 813 and the DRAM 814 operates as a working memory to store, for example, programs to be executed by the CPU 811 or data currently processed. More specifically, in one example, the DRAM 814 stores image data currently processed by the image processor 804 and data of a processed equirectangular projection image.

The operation device 815 is a collective term for various operation buttons including, for example, a shutter button. The operation device 815 allows an operator who operates the operation device 815 to input, for example, various imaging modes or imaging conditions.

The network I/F 816 is a collective term for interface circuits such as a universal serial bus (USB) I/F that allows the wide-angle imaging device 8 to communicate with an external medium such as a secure digital (SD) card or an external personal computer. As the network I/F 816, including both wireless and wired connections. The data of the equirectangular projection image stored in the DRAM 814 is recorded in an external medium via the network I/F 816 or is transmitted to an external terminal (apparatus) via the network I/F 816 as appropriate.

The short-range communication circuit 817 establishes communication with an external terminal (for example, the robot terminal 7) via the antenna 817a of the wide-angle imaging device 8 through a short-range wireless communication technology such as Wi-Fi, NFC, or BLUETOOTH (registered trademark). By the short-range communication circuit 817, the data of the equirectangular projection image can be transmitted to an external terminal.

The electronic compass 818 calculates the orientation of the wide-angle imaging device 8 from the earth's magnetism and outputs orientation information indicating the orientation. The orientation information is an example of related information that is metadata described in compliance with Exchangeable image file format (Exif) and is used for image processing such as image correction performed on a captured image. The related data includes data indicating the date and time when an image is captured and data indicating the size of the image data.

The gyroscopic sensor 819 detects a change in tilt of the wide-angle imaging device 8 (roll, pitch, yaw) due to, for example, the movement of the wide-angle imaging device 8. The change in tilt is one example of the related information (metadata) described in compliance with Exif, and used for image processing such as image correction performed on a captured image.

The acceleration sensor 820 detects triaxial acceleration. The attitude (an angle with respect to the direction of gravity) of the wide-angle imaging device 8 is detected based on detected acceleration. Having both of the gyroscopic sensor 819 and the acceleration sensor 820, the wide-angle imaging device 8 can increase accuracy of image correction.

Spherical Video

Figure 7:
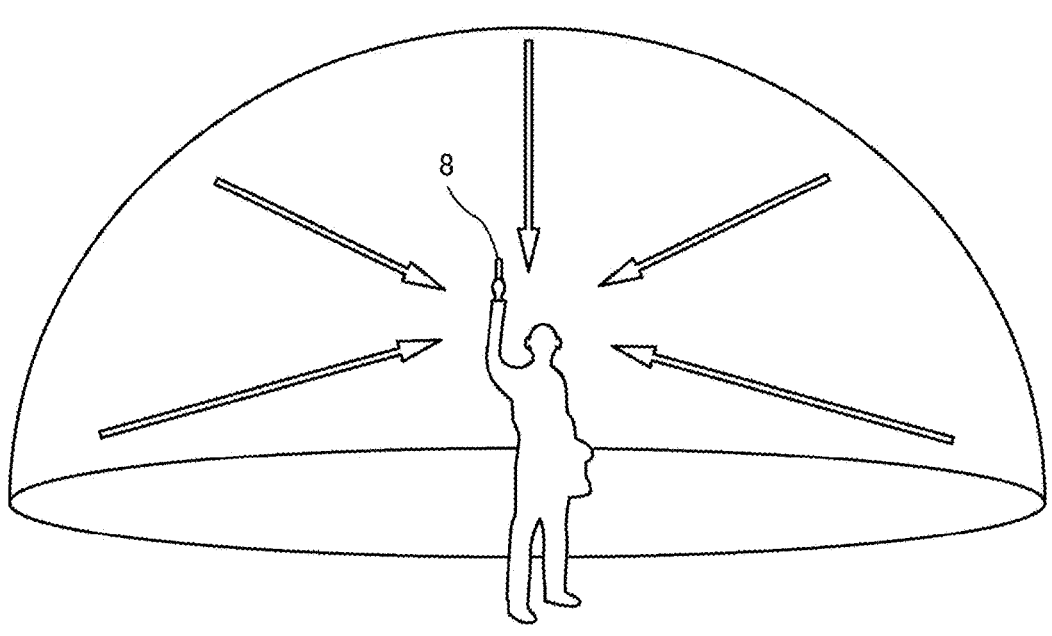
FIG. 7 is an illustration of how a wide-angle imaging device is used according to some embodiments of the present disclosure.

A situation in which the wide-angle imaging device 8 is used is described below with reference to FIG. 7. FIG. 7 is an illustration of an example of the use of the wide-angle imaging device 8 according to the present embodiment. As illustrated in FIG. 7, for example, the wide-angle imaging device 8 is used for capturing objects surrounding a user who is holding the wide-angle imaging device 8 in his or her hand. The imaging elements 803a and 803b illustrated in FIG. 6 capture the objects surrounding the user to obtain two hemispherical images.

Figure 9B:
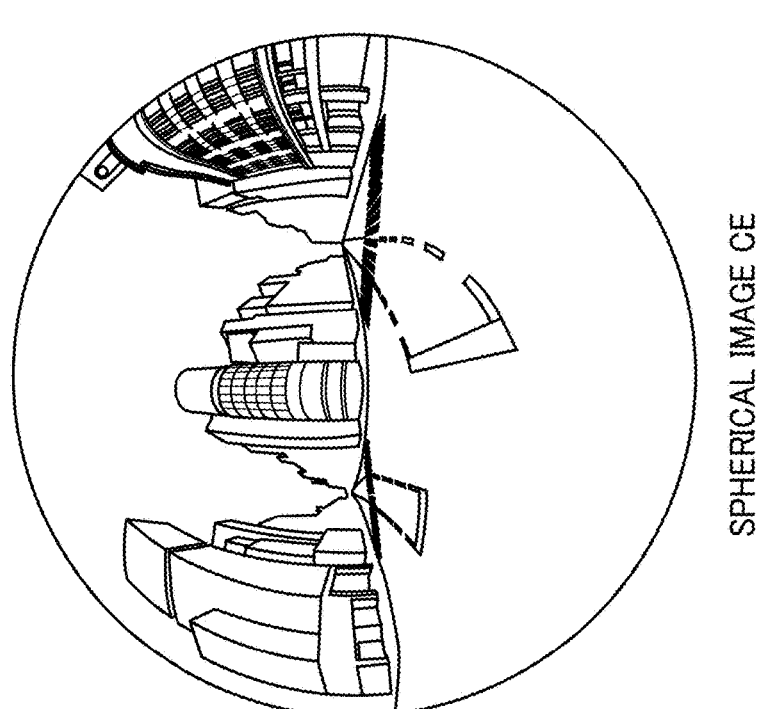
FIG. 9B is an illustration of a spherical image, according to some embodiments of the present disclosure.
Figure 9A:
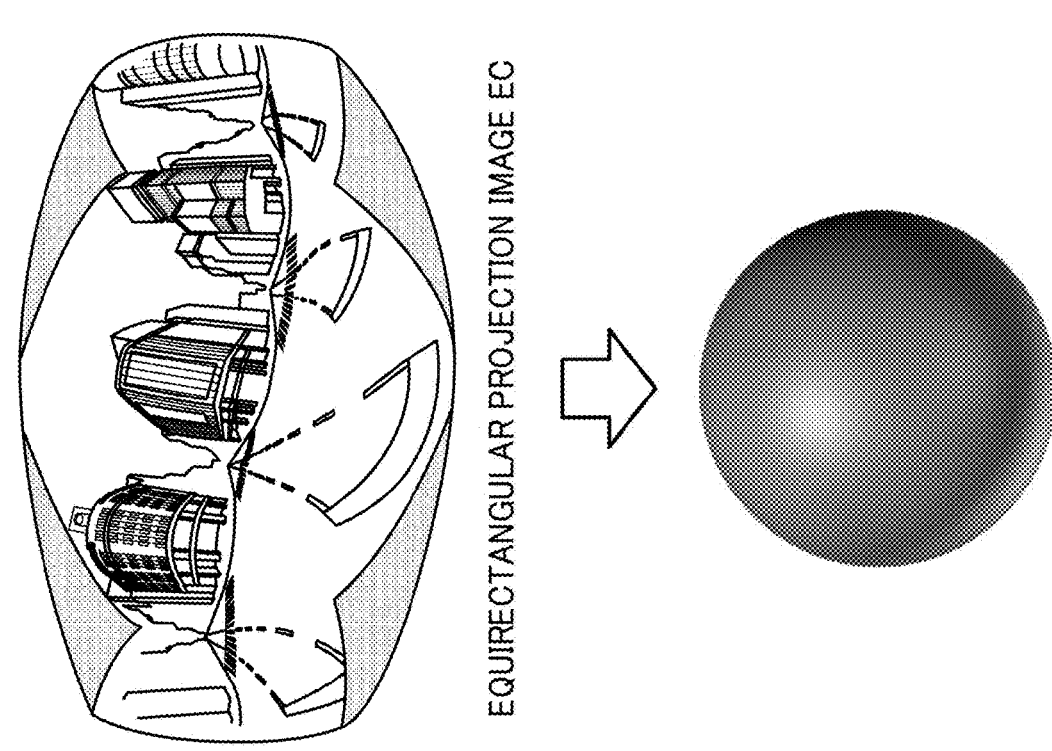
FIG. 9A is a diagram illustrating an example of how an equidistant cylindrical projection image is mapped to a surface of a sphere, according to some embodiments of the present disclosure.

An overview of a process for generating an equirectangular projection image and a spherical image from images captured by the wide-angle imaging device 8 is described below with reference to FIG. 8 (FIG. 8A to FIG. 8C) and FIG. 9 (FIG. 9A and FIG. 9B). FIG. 8A is a diagram illustrating a hemispherical image (front side) captured by the wide-angle imaging device 8. FIG. 8B is a diagram illustrating a hemispherical image (back side) captured by the wide-angle imaging device 8. FIG. 8C is a diagram illustrating an image in equirectangular projection, which is referred to as an "equirectangular projection image" (or equidistant cylindrical projection image). FIG. 9A is a diagram illustrating how an equirectangular projection image is mapped to a surface of a sphere according to the present embodiment. FIG. 9B is a diagram illustrating a spherical image according to the present embodiment.

As illustrated in FIG. 8A, an image captured by the imaging element 803a is a curved hemispherical image (front side) due to the fisheye lens 802a, which is described later. Further, as illustrated in FIG. 8B, an image captured by the imaging element 803*b* is a curved hemispherical image (back side) captured by the fisheye lens 802*b*, which is described later. The wide-angle imaging device 8 combines the hemispheric image (front side) and the hemispheric image (back side) that is inverted by 180 degrees, to generate an equirectangular projection image EC as illustrated in FIG. 8C.

The equirectangular projection image is attached so as to cover the sphere surface using Open Graphics Library for Embedded Systems (OpenGL ES) as illustrated in FIG. 9A, and a spherical image CE as illustrated in FIG. 9B is generated, accordingly. In other words, the spherical image CE is represented as an image corresponding to the equirectangular projection image EC oriented toward the center of the sphere.

OpenGL ES is a graphic library used for visualizing two-dimensional (2D) data and three-dimensional (3D) data. The spherical image CE may be either a still image or a moving image.

As described above, since the spherical image CE is an image attached to the sphere surface to cover the sphere surface, a part of the image may look distorted when viewed from the user, giving a feeling of strangeness. To cope with this, the wide-angle imaging device 8 can display a predetermined area that is a part of the spherical image CE (such an image may be referred to as a predetermined-area image in the following description) as a planar image with little curvature, thus allowing display without giving a feeling of strangeness to the user. Regarding this matter, explanation is given with reference to FIG. 10 and FIG. 11 (FIG. 11A to FIG. 11D). The predetermined-area image may be a moving image or a still image.

Figure 10:
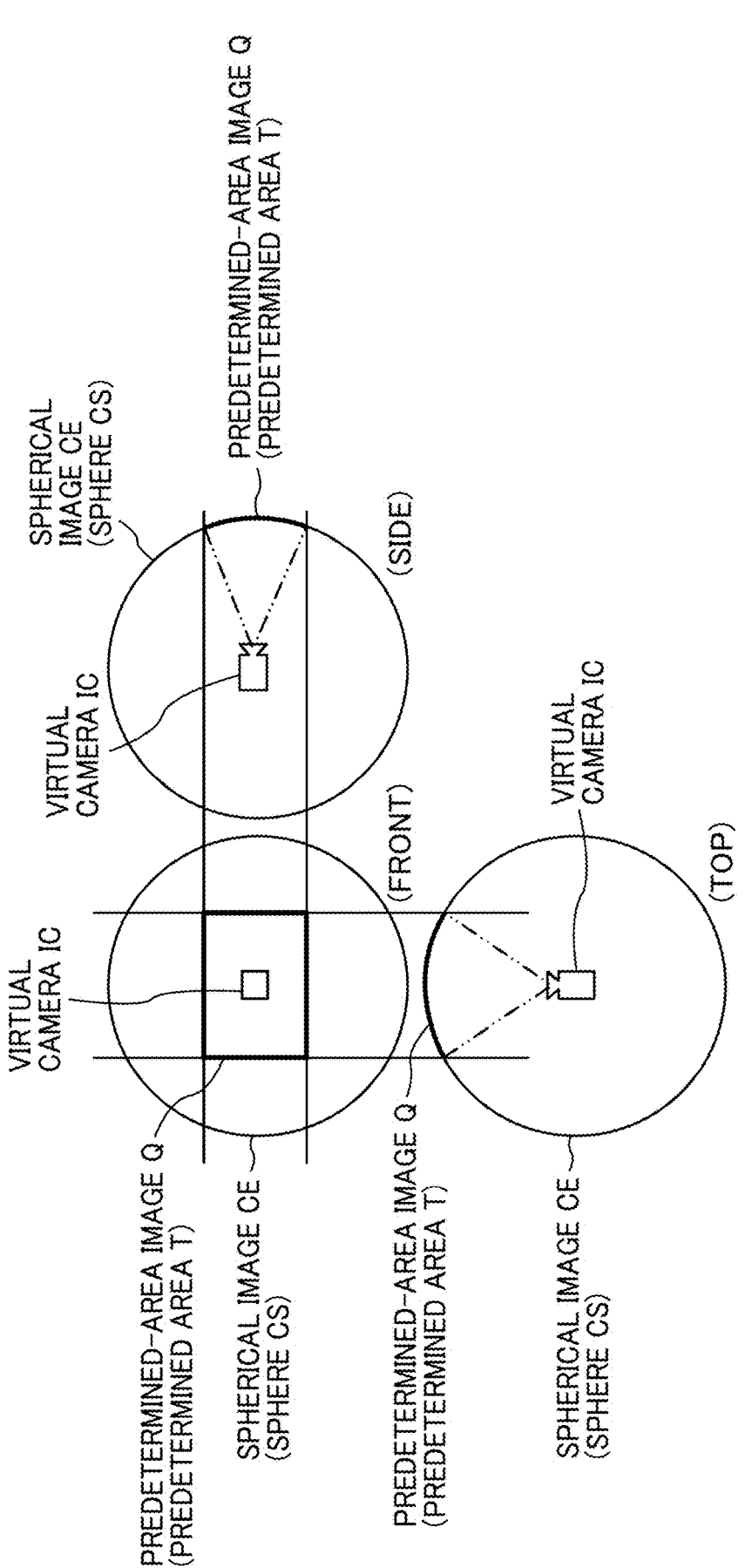
FIG. 10 is an illustration of relative positions of a virtual camera and a predetermined area in the case where a spherical image is represented as a surface area of a three-dimensional solid sphere, according to some embodiments of the present disclosure.
Figure 11A:
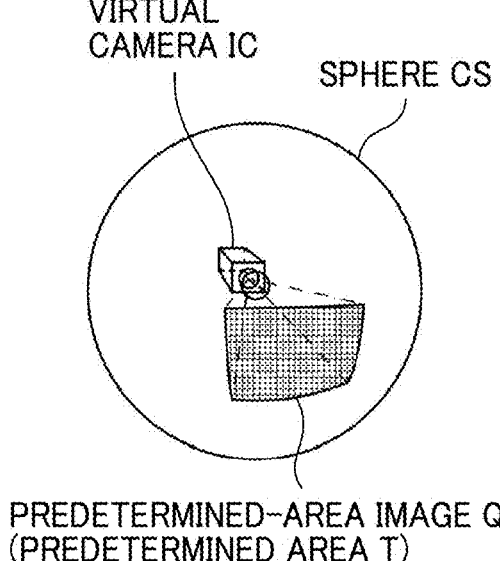
FIG. 11A is a perspective view of FIG. 10.
Figure 11B:
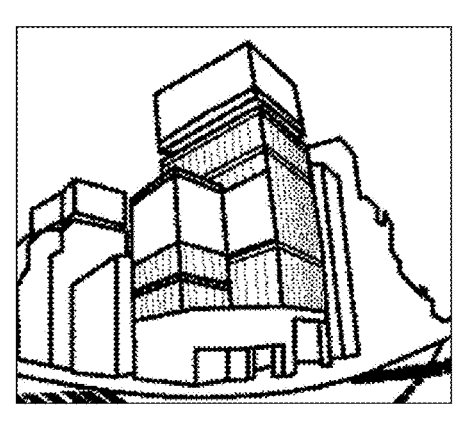
FIG. 11B is a diagram illustrating a predetermined-area image of FIG. 11A being displayed on a display, according to some embodiments of the present disclosure.

FIG. 10 is an illustration of relative positions of a virtual camera IC and a predetermined area T when the spherical image is represented as a three-dimensional solid sphere, according to the present embodiment. A virtual camera IC corresponds to a position of a point of view (viewpoint) of an operator who is viewing the spherical image CE represented as a surface area of the three-dimensional solid sphere. FIG. 11A is a perspective view of FIG. 10. FIG. 11B is a view illustrating a predetermined-area image displayed on a display according to the present embodiment. In FIG. 11A, the spherical image CE illustrated in FIG. 10 is represented as a surface area of the three-dimensional solid sphere CS. As described above, when the spherical image CE is considered as a surface area of the solid sphere CS, the virtual camera IC is outside of the spherical image CE as illustrated in FIG. 11. The predetermined area T in the spherical image CE is an imaging area of the virtual camera IC. Specifically, the predetermined area T is specified by predetermined-area information indicating an imaging direction and an angle of view of the virtual camera IC in a three-dimensional virtual space containing the spherical image CE. Further, zooming in the predetermined area T is also expressed by bringing the virtual camera IC closer to or away from the spherical image CE. A predetermined-area image Q is an image of the predetermined area T in the spherical image CE. The predetermined area T is defined by an angle of view a and a distance f from the virtual camera IC to the spherical image CE (see FIG. 12).

The predetermined-area image Q, which is an image of the predetermined area T illustrated in FIG. 11A, is displayed on a predetermined display as an image of an imaging area of the virtual camera IC, as illustrated in FIG. 11B. The image illustrated in FIG. 11B is a predetermined-area image represented by predetermined-area information set to initial settings (default settings). In the following description of the present embodiment, an imaging direction (ea, aa) and the angle of view a of the virtual camera IC are used. In another example, the predetermined area T is identified by an imaging area (X, Y, Z) of the virtual camera IC, i.e., the predetermined area T, instead of the angle of view a and the distance f.

Figure 11C:
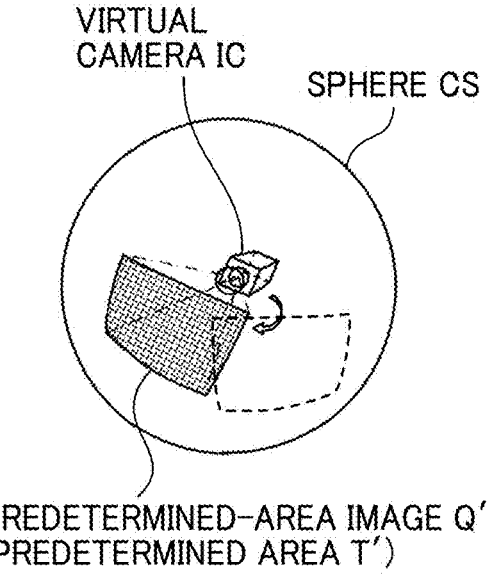
FIG. 11C is a view illustrating a predetermined area after a viewpoint of the virtual camera in FIG. 11A is changed, according to some embodiments of the present disclosure.
Figure 11D:
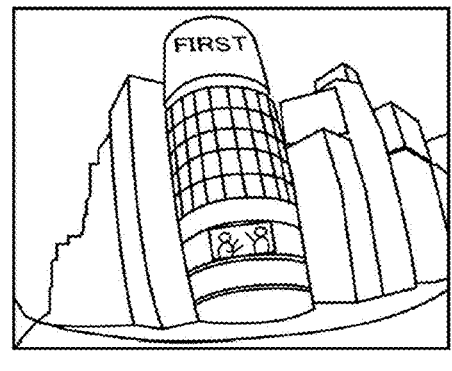
FIG. 11D is a diagram illustrating the predetermined-area image of FIG. 11C being displayed on a display, according to some embodiments of the present disclosure.

When the virtual viewpoint of the virtual camera IC is moved (changed) from the state illustrated in FIG. 11A to the right (left in the drawing) as illustrated in FIG. 11C, the predetermined area T in the spherical image CE is moved to a predetermined area T'. Accordingly, the predetermined-area image Q displayed on the predetermined display is changed to a predetermined-area image Q'. As a result, on a display area 150, which is described later with reference to FIG. 23, on the user terminal 9 that is a transmission destination, the image illustrated in FIG. 11B is changed to the image illustrated in FIG. 11D to be displayed.

Figure 12:
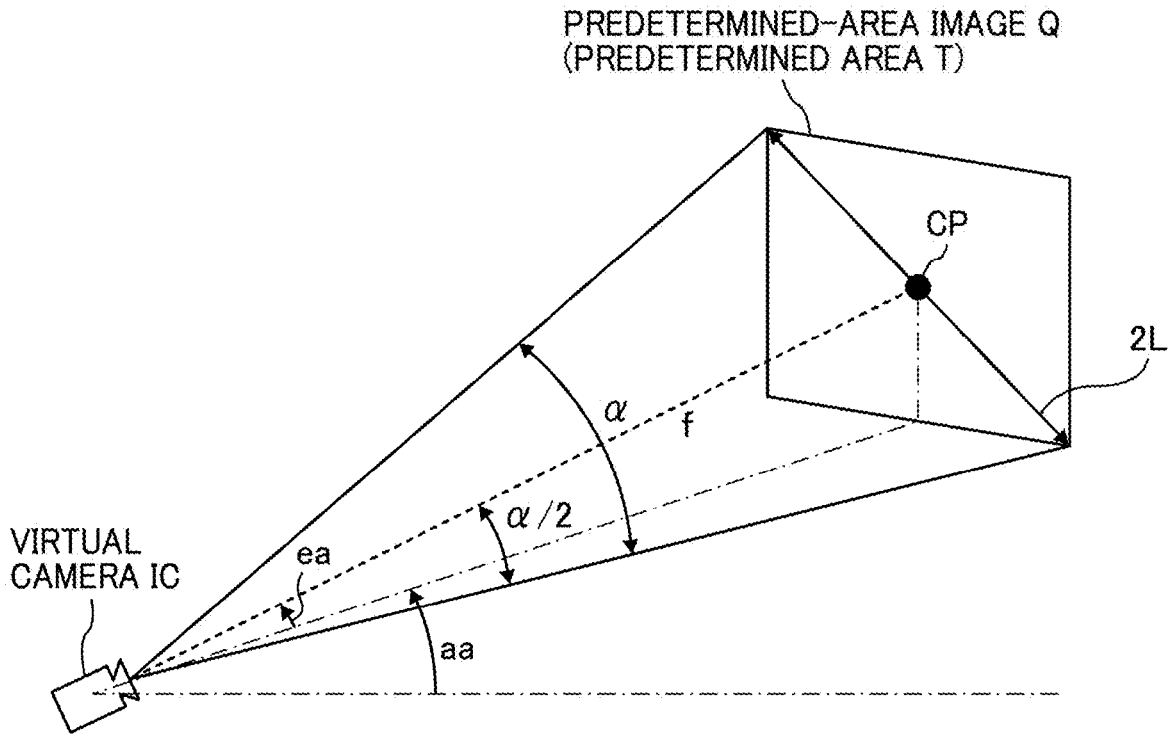
FIG. 12 is a view illustrating a relation between predetermined-area information and a predetermined area, according to some embodiments of the present disclosure.

Referring to FIG. 12, a relation between the predetermined-area information and the image of the predetermined area T is described below according to the present embodiment. FIG. 12 is a diagram illustrating a relation between the predetermined area information and the predetermined area T, according to the present embodiment. As illustrated in FIG. 12, "ea" denotes the elevation angle, "aa" denotes the azimuth angle, and "a" denotes the angle of view, respectively, of the virtual camera IC. The position of the virtual camera IC is adjusted, such that the point of gaze of the virtual camera IC, indicated by the imaging direction (ea, aa), matches the center point CP of the predetermined area T as the imaging area of the virtual camera IC. As illustrated in FIG. 12, when it is assumed that a diagonal angle of the predetermined area T specified by the angle of view a of the virtual camera IC is a, the center point CP provides the parameters (x, y) of the predetermined-area information. "f" denotes a distance from the virtual camera IC to the center point CP of the predetermined area T. "L" is a distance between the center point CP and a given vertex of the predetermined area T (2L is a diagonal line). In FIG. 12, a trigonometric function equation generally expressed by the following formula 1 is satisfied.

$$L/f = \tan(\alpha/2) \tag{Formula 1}$$

Hardware Configuration of Vehicle Device

Figure 13:
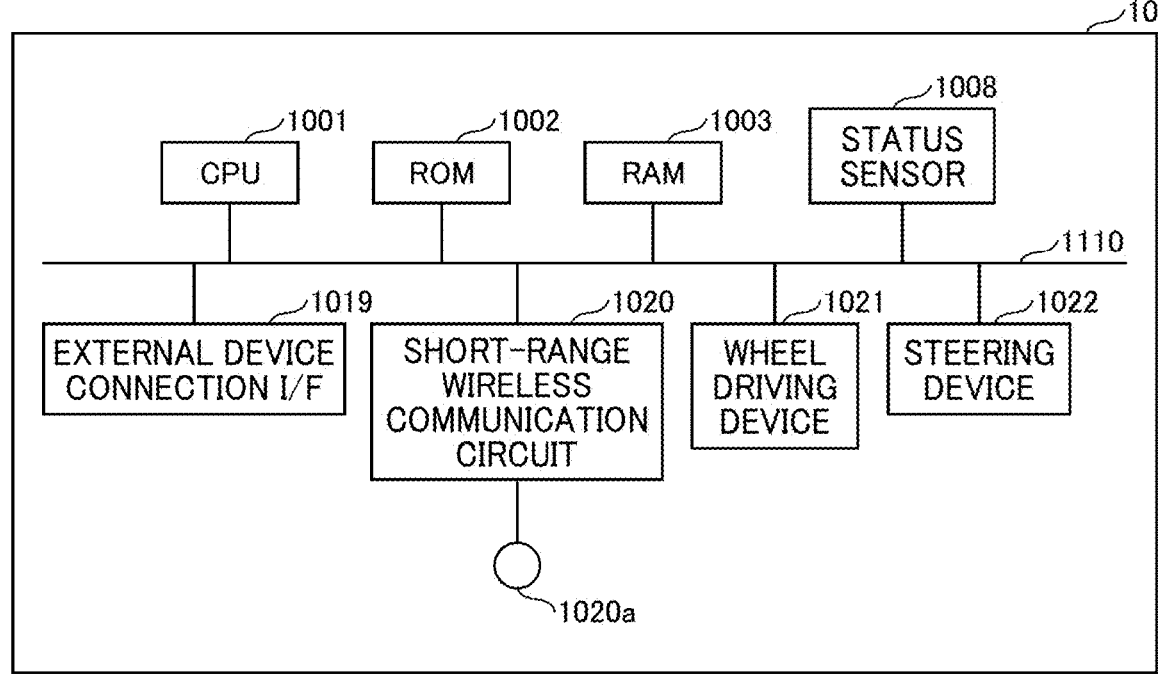
FIG. 13 is a block diagram illustrating a hardware configuration of a vehicle device according to some embodiments of the present disclosure.

FIG. 13 is a block diagram illustrating a hardware configuration of a vehicle device according to the present embodiment. The vehicle device 10 includes, for example, a CPU 1001, a ROM 1002, a RAM 1003, a status sensor 1008, an external device connection I/F 1019, a short-range communication circuit 1020, an antenna 1020*a* for the short-range communication circuit 1020, a wheel driving device 1021, and a steering device 1022.

The CPU 1001 is an arithmetic device that executes a program stored in the ROM 1002 to implement the functions of the vehicle device 10. The ROM 1002 is a nonvolatile memory storing data such as a program for the vehicle device 10. The ROM 1002 may be a rewritable flash memory, such as a flash ROM. The RAM 1003 is a volatile memory used as, for example, a working area for the CPU 1001.

The status sensor 1008 is a sensor that detects a status of the robot R such as the movement (traveling), inclination, and malfunction of the robot R.

The external device connection I/F 1019 is a wired communication interface for performing wired connection and communication with, for example, the robot terminal 7.

The short-range communication circuit 1020 is, for example, a wireless communication interface for performing wireless communication by the same wireless communication method as that of, for example, the robot terminal 7.

The wheel driving device 1021 serves as a driving device that drives one or more wheels for causing the vehicle device 10 to move. The wheel driving device 1021 includes, for example, a motor.

The steering device 1022 serves as a steering device that steers the vehicle device 10 that is caused to move by the wheel driving device 1021. For example, the steering device 1022 may change the direction or inclination of one or more wheels, or may change the direction of the vehicle device 10 (robot R) by controlling the number of rotations or speed of the left wheel and the right wheel.

Functional Configuration of Communication System

Figure 14:
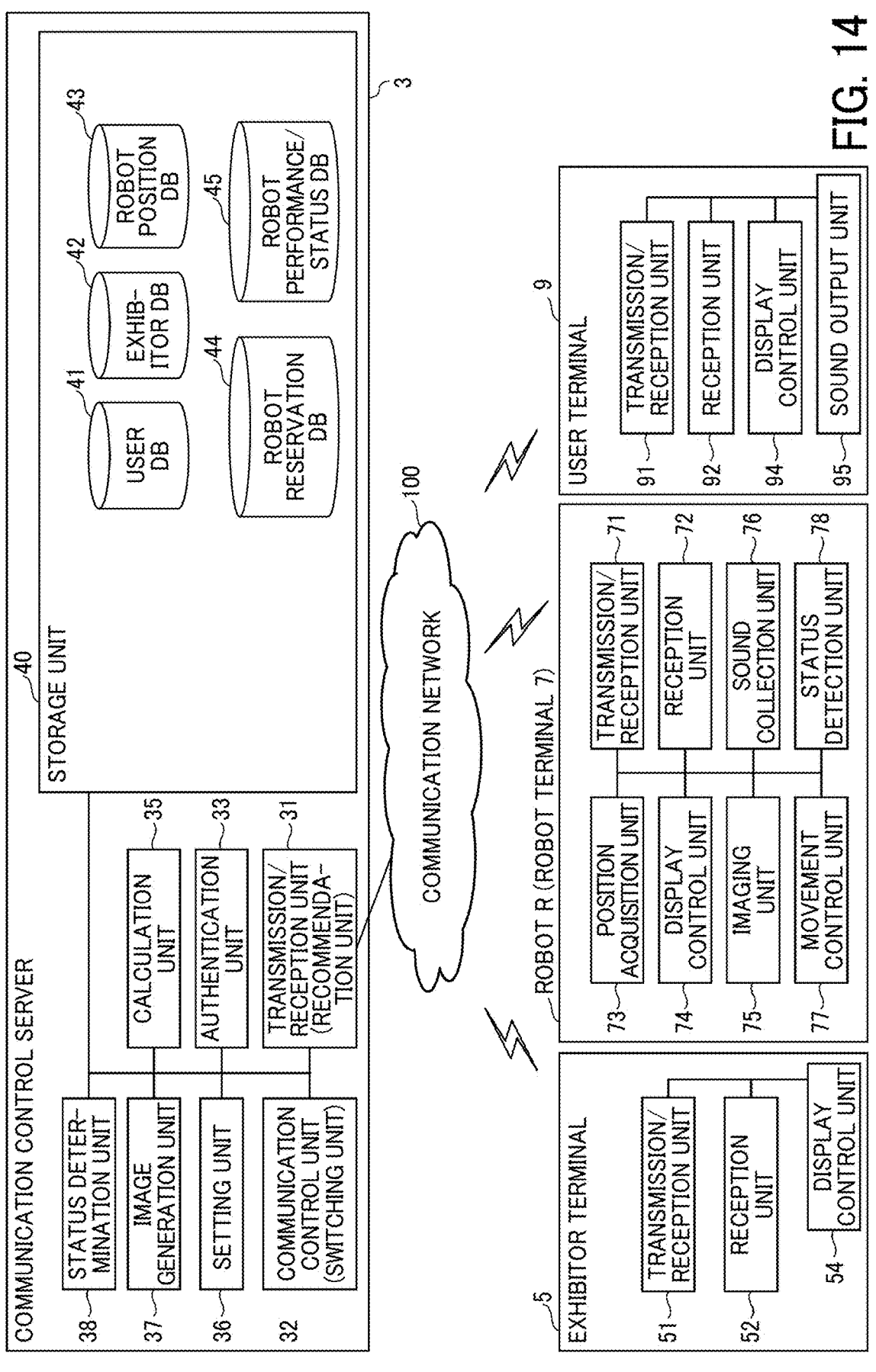
FIG. 14 is a block diagram illustrating a functional configuration of a communication system according to some embodiments of the present disclosure.

A functional configuration of the communication system 1 is described with reference to FIG. 14. FIG. 14 is a block diagram illustrating a functional configuration of the communication system 1 according to the present embodiment.

Communication Control Server

As illustrated in FIG. 14, the communication control server 3 includes a transmission/reception unit 31, a communication control unit 32, an authentication unit 33, a calculation unit 35, a setting unit 36, an image generation unit 37, and a status determination unit 38. These units are functions or devices implemented by operating one or more of the components illustrated in FIG. 3 in response to an instruction from the CPU 301 operating according to a program loaded from the SSD 304 to the RAM 303. The communication control server 3 further includes a storage unit 40 implemented by the ROM 302, the RAM 303, or the SSD 304 illustrated in FIG. 3. The storage unit 40 stores position correspondence information (matching information) indicating a correspondence relationship between a position in the real space and a position in the virtual space.

User Management Table

FIG. 15 is a conceptual diagram illustrating a user management table according to the present embodiment. In the storage unit 40, a user DB 41 is stored, and the user DB 41 includes a user management table illustrated in FIG. 15. In the user management table, information items of "USER NAME," "USER ID," "PASSWORD," and "USER ATTRIBUTE(S)" are associated with each other and managed.

The "USER ID" is an example of user identification information used to identify a user. In the data item of "PASSWORD," a password for each user is indicated.

In the data item of "USER ATTRIBUTE(S)," information indicating, for example, a business category, an occupation, or a job title of each user is indicated.

Exhibitor Management Table

FIG. 16 is a conceptual diagram illustrating an exhibitor management table according to the present embodiment. In the storage unit 40, an exhibitor DB 42 is stored, and the exhibitor DB 42 includes an exhibitor management table illustrated in FIG. 16. In the exhibitor management table, information items of "EXHIBITOR NAME," "EXHIBITOR ID," "PASSWORD," "ATTRIBUTE OF EXHIBITOR," "EXHIBITION AREA," "AREA CONGESTION LEVEL," "BOOTH NAME," "BOOTH CONGESTION LEVEL," and "MESSAGE FROM EXHIBITOR" are associated with each other and managed.

The "EXHIBITOR ID" is an example of exhibitor identification information used to identify an exhibitor. In the data item of "PASSWORD," a password for each exhibitor is indicated.

In the data item of "ATTRIBUTE," information indicating, for example, a business category of each exhibitor (for example, company, person) or a product (or service) to be handled is indicated.

The "EXHIBITION AREA" indicates a predetermined exhibition area in the exhibition hall in the real space. The "AREA CONGESTION LEVEL" indicates the congestion level of each exhibition area, and is managed in five levels in the present embodiment, and "LEVEL 1" indicates low congestion, while "LEVEL 5" indicates high congestion. For example, Level 1 represents 0 to 100 people, Level 2 represents 101 to 200 people, Level 3 represents 201 to 300 people, Level 4 represents 301 to 400 people, and Level 5 represents 401 or more people.

The "BOOTH NAME" indicates a name of each booth of corresponding one of the exhibitors E partitioning the exhibition area. The "BOOTH CONGESTION LEVEL" indicates the congestion level of each booth, and is managed in five levels in the present embodiment, and "LEVEL 1" indicates low congestion, while "LEVEL 5" indicates high congestion. For example, Level 1 represents 0 to 10 people, Level 2 represents 11 to 20 people, Level 3 represents 21 to 30 people, Level 4 represents 31 to 40 people, and Level 5 represents 41 or more people. The booth congestion level is determined based on headcount information from the human presence sensor 6 installed in each booth, and the headcount information is overwritten to be saved each time the headcount information is sent from the human presence sensor 6. The "AREA CONGESTION LEVEL" is an average value of the "BOOTH CONGESTION LEVEL" in the same area.

The "MESSAGE FROM EXHIBITOR" is a message sent from each exhibitor terminal 5.

Robot Position Management Table

FIG. 17 is a conceptual diagram illustrating a robot position management table according to the present embodiment. In the storage unit 40, a robot position DB 43 is stored, and the robot position DB 43 includes a robot position management table illustrated in FIG. 17. In the robot position management table, information items of "NAME" of robot, "ROBOT ID," "PASSWORD," "ICON IMAGE" representing the robot, "LATEST POSITION IN REAL SPACE," "LATEST POSITION IN VIRTUAL SPACE," and USER ID OF USER REMOTELY OPERATING" are associated with each other and managed.

The "ROBOT ID" is an example of robot (mobile apparatus) identification information used to identify a robot. In the data item of "PASSWORD," a password for each robot is indicated.

The "ICON IMAGE" is an image displayed on each user terminal and is an image schematically representing the robot.

The "LATEST POSITION IN REAL SPACE" indicates position information indicating the latest position in the real space, and the information is transmitted from each robot R at predetermined time intervals (for example, every second).

The "LATEST POSITION IN VIRTUAL SPACE" indicates position information indicating the latest position in the virtual space, and the position information is obtained from the position information of each robot R in the real space by the setting unit 36 using the matching information.

The "USER ID OF USER REMOTELY OPERATING" indicates the user ID of the user who is remotely operating the predetermined robot R. This can identify the relationship between the robot R and the user remotely operating.

Robot Reservation Management Table

FIG. 18 is a conceptual diagram illustrating a robot reservation management table according to the present embodiment. In the storage unit 40, a robot reservation DB 44 is stored, and the robot reservation DB 44 includes a robot reservation management table for each exhibition date (for example, Jan. 15, 2023). In the robot reservation management table, information items of "EXHIBITION AREA," "NAME" of robot, "ROBOT ID," "BOOTH AT INITIAL POSITION," "EXHIBITOR AT INITIAL POSITION," "ATTRIBUTE OF EXHIBITOR," "RESERVATION TIME SLOT," and "REFERENCE INFORMATION" are associated with each other and managed.

The "EXHIBITION AREA," the "NAME" of robot, the "ROBOT ID," and the "ATTRIBUTE OF EXHIBITOR" are the same as the contents of the same names described above.

The "BOOTH AT INITIAL POSITION" indicates the nearest booth where the robot is set up at the beginning (for example, 9:00) of the exhibition day.

The "EXHIBITOR AT INITIAL POSITION" indicates an exhibitor who is exhibiting at the nearest booth where the robot is set up at the beginning (for example, 9:00) of the exhibition day.

The "RESERVATION TIME SLOT" indicates the user ID of the user who has reserved the robot for each time slot (in the present embodiment, one hour). The same user can reserve multiple robots R in the same time slot.

The "REFERENCE INFORMATION" indicates information that can be referred to when the user Y who makes a reservation selects the robot R. For example, the user Y may reserve the robot R provided with the wide-angle imaging device 8 for capturing full-sphere images.

Robot Performance/Status Management Table

FIG. 19 is a conceptual diagram illustrating a robot performance/status management table according to the present embodiment. In the storage unit 40, a robot performance/status DB 45 is stored, and the robot performance/status DB 45 includes a robot performance/status management table illustrated in FIG. 19. In the robot performance/status management table, information items of "NAME" of robot, "ROBOT ID," "TYPE OF IMAGING DEVICE," "MAXIMUM MOVEMENT SPEED," "AMOUNT OF BATTERY REMAINING," "COMMUNICATION STATUS," "TOTAL OPERATION TIME," and "MALFUNCTION STATUS" are associated with each other and managed.

The "NAME" of robot and the "ROBOT ID" are the same as the contents of the same name described above. The "TYPE OF IMAGING DEVICE" and the "MAXIMUM MOVEMENT SPEED" are examples of information indicating the performance of the robot R, and are static information registered in advance. The "AMOUNT OF BATTERY REMAINING," the "COMMUNICATION STATUS," the "TOTAL OPERATION TIME," and the "MALFUNCTION STATUS" are examples of information indicating the status of the robot R, and are dynamic information to be overwritten to be saved by the status information (see Step S51 in FIG. 25) transmitted from the robot R.

The "TYPE OF IMAGING DEVICE" indicates whether the imaging device installed on the robot R is a wide-angle imaging device that can capture full-sphere images or a standard imaging device that can capture regular images.

The "MAXIMUM MOVEMENT SPEED" indicates the maximum movement speed of the robot R, and is managed in five levels in the present embodiment, and indicates that the speed increases from "Level 1" to "Level 5." For example, Level 1 represents 1 km/h, Level 2 represents 2 km/h, Level 3 represents 3 km/h, Level 4 represents 4 km/h, and Level 5 represents 5 km/h or higher.

The "AMOUNT OF BATTERY REMAINING" indicates the amount of remaining of the battery of the robot R, and is represented by "%" in the present embodiment.

The "COMMUNICATION STATUS" represents the communication status (communication speed) of the robot R, and is managed in five levels in the present embodiment, and indicates that the speed increases from "Level 1" to "Level 5." For example, Level 1 represents 0 Mbps, Level 2 represents more than 0 Mbps and less than 10 Mbps, Level 3 represents 10 Mbps or more and less than 100 Mbps, Level 4 represents 100 Mbps or more and 1 Gbps, and Level 5 represents 1 Gbps or more.

The "total operation time" indicates the total operation time from the last maintenance of the robot R, and is represented by "MINUTES" in the present embodiment.

The "MALFUNCTION STATUS" indicates a malfunction status of the robot R, and is managed in three levels in the present embodiment, and indicates a serious malfunction as the level value increases, namely "Level 2" indicates the most serious malfunction among the levels in the present embodiment. For example, Level 0 represents a status in which there is no malfunction, namely the proper operational status, Level 1 represents a malfunction that has a relatively small influence on the remote operation of the robot R (for example, unable to collect sound), and Level 2 represents a malfunction that has a relatively large influence on the remote operation of the robot R (for example, unable to capture images).

Functional Units

The transmission/reception unit 31 communicates, or exchanges data, with another terminal (device). The transmission/reception unit 31 also serves as a recommendation unit, and provide to the user terminal 9 a recommendation to switch the communication (communication destination) of the user terminal 9 from a first robot to a second robot when the status of the robot R indicated by status information is a predetermined status (for example, a status in which the amount of battery remaining is less than a first remaining amount (remaining-amount threshold). The predetermined status is set in advance by, for example, an administrator, but is changeable.

The communication control unit 32 performs control to establish communication (communication session) between the user terminal 9 and the robot R. The communication control unit 32 also serves as a switching unit and performs control to switch the communication (communication destination) of the user terminal 9 from the first robot to the second robot.

The authentication unit 33 performs login authentication of another terminal (apparatus).

The calculation unit 35 stores the message from the exhibitor terminal 5 in the exhibitor DB 42 (see FIG. 16), more specifically in the field of "MESSAGE FROM EXHIBITOR" of a record that includes the exhibitor ID received by the transmission/reception unit 31, and also overwrites and saves the headcount information (level) from the human presence sensors 6 in the field of "BOOTH CONGESTION LEVEL." In this case, the calculation unit 35 calculates the mean value of the congestion levels in the booths for each exhibition area and overwrites and saves the numerical value in the field of "AREA CONGESTION LEVEL." The exhibitor terminal 5 can additionally store or overwrite to save messages in the communication control server 3, or delete (or change) some or all of the messages.

The setting unit 36 overwrites and saves position information indicating the latest position in the real space transmitted from the robot R in the field of "LATEST POSITION IN REAL SPACE" related to the robot position DB 43 (see FIG. 17). The setting unit 36 obtains position information indicating the latest position in the virtual space from the position information indicating the latest position in the real space transmitted from the robot R using position correspondence information (matching information) indicating a correspondence relationship between a position on the real space and a position on the virtual space. The setting unit 36 overwrites and saves the obtained the position information indicating the latest position in the real space in the field of "latest position in virtual space" related to the robot position DB 43.

The status determination unit 38 determines whether the robot R is in a predetermined status due to a malfunction occurring in the robot R, based on the status information transmitted from the robot R. The criteria for determining whether the robot R is in the predetermined status are, for example, as follows, and the robot R is determined to be in the predetermined status when the robot R is in one or more of the following statuses.

(11) The amount of battery remaining of the robot R is less than the first remaining amount (remaining-amount threshold) (for example 30%).

(12) The communication speed of the robot R is less than a first communication speed (communication-speed threshold) (for example, Level 2).

(13) The total operation time from the last maintenance of the robot R is equal to or longer than a first time (time threshold) (for example, 1000 minutes).

(14) The robot has a first malfunction (predetermined malfunction) (for example, unable to collect sound).

The predetermined status may be a status associated with a determination criterion for determining whether to switch the robot R or whether to recommend switching the robot R, and is not limited to the predetermined status in which a malfunction has occurred.

Figure 23:
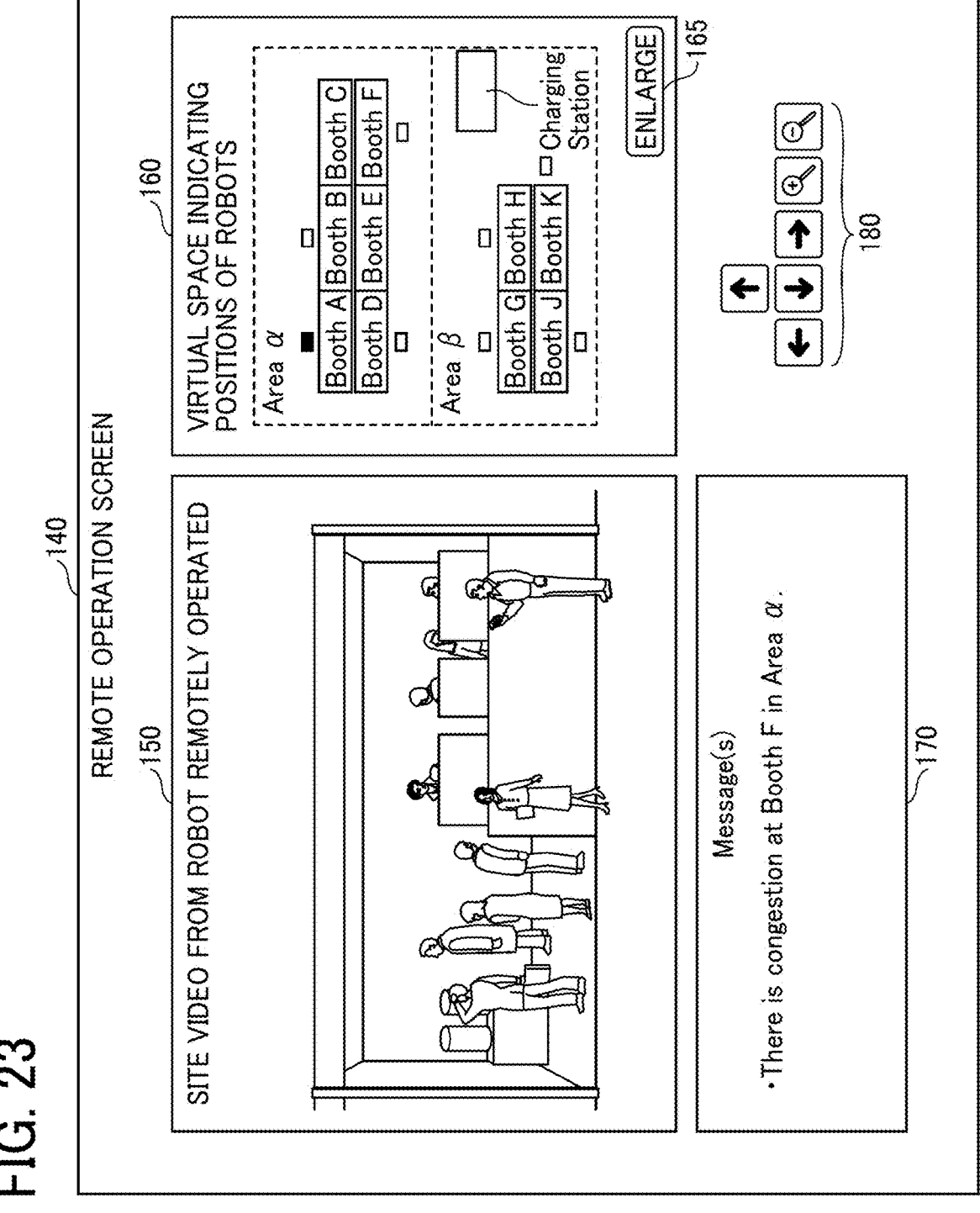
FIG. 23 is a diagram illustrating a remote operation screen displayed on a user terminal according to some embodiments of the present disclosure.

The image generation unit 37 generates an image of a remote operation screen illustrated in FIG. 23 described later.

The status determination unit 38 determines whether the robot R11 is in a specific status that is worse than the predetermined status based on the status information received in the processing of Step S51. The criteria for determining whether the robot R is in the specific status are, for example, as follows, and the robot R is determined to be in the specific status when the robot R is in one or more of the following statuses.

(21) The amount of battery remaining of the robot R is less than a second remaining amount (another remaining-amount threshold) (for example 10%) that is less than the first remaining amount.

(22) The communication speed of the robot R is less than a second communication speed (another communication-speed threshold) (for example, Level 1) that is less than the first communication speed (communication sped threshold) (for example, Level 2).

(23) The total operation time from the last maintenance of the robot R is equal to or longer than a second time (another time threshold) (for example, 1500 minutes) that is longer than the first time (time threshold) (for example, 1000 minutes).

(24) The robot has a second malfunction (another predetermined malfunction) (for example, unable to capture an image) that is worse than the first malfunction (predetermined malfunction) (for example, unable to collect sound).

Exhibitor Terminal

As illustrated in FIG. 14, the exhibitor terminal 5 includes a transmission/reception unit 51, a reception unit 52, and a display control unit 54. These units are functions or devices implemented by operating one or more of the components illustrated in FIG. 4 in response to an instruction from the CPU 501 operating according to the a program loaded from the EEPROM 504 to the RAM 503.

The transmission/reception unit 51 communicates, or exchanges data, with another terminal (device) via the communication network 100.

The reception unit 52 receives an operation of a person (for example, an exhibitor E).

The display control unit 54 cause the display 518 of the exhibitor terminal 5 to display various images.

Robot Terminal

As illustrated in FIG. 14, the robot R (the robot terminal 7) includes a transmission/reception unit 71, a reception unit 72, a position acquisition unit 73, a display control unit 74, an imaging unit 75, a sound collection unit 76, a movement control unit 77, and a status detection unit 78. These units are functions or devices implemented by operating one or more of the components illustrated in FIG. 4 in response to an instruction from the CPU 501 operating according to the a program loaded from the EEPROM 504 to the RAM 503.

The transmission/reception unit 71 communicates, or exchanges data, with another terminal (device) via the communication network 100.

The reception unit 72 receives an operation of a person (for example, an exhibitor E, an administrator of exhibition hall, etc.).

The position acquisition unit 73 acquires position information indicating an outdoor or indoor position by processing of, for example, the GPS receiver 511.

The display control unit 74 causes the display 518 of the robot terminal 7 to display various images.

The imaging unit 75 outputs video data obtained by capturing with, for example, the wide-angle imaging device 8 or the COMS S513. The video data is transmitted to the user terminal 9 that is remotely operated, and is output as a video on the user terminal 9.

The sound collection unit 76 outputs sound data obtained by collecting sound with, for example, the wide-angle imaging device 8 or the microphone 515. The sound data is transmitted to the user terminal 9 that is remotely operated, and is output as sound on the user terminal 9.

The movement control unit 77 controls movement (including rotation) of the vehicle device 10 based on remote operation of the remote user Y.

The status detection unit 78 detects the status (for example, amount of battery remaining) of the robot R, which is the self-included device, at predetermined time intervals (for example, every minute). The status information indicating the status is transmitted to the communication control server 3, and is managed as "AMOUNT OF BATTERY REMAINING," "COMMUNICATION STATUS," "TOTAL OPERATION TIME," or "MALFUNCTION STATUS" in the robot performance/status DB 45 (see FIG. 19).

User Terminal

As illustrated in FIG. 14, the user terminal 9 includes a transmission/reception unit 91, a reception unit 92, a display control unit 94, and a sound output control unit 95. These units are functions or devices implemented by operating one or more of the components illustrated in FIG. 4 in response to an instruction from the CPU 501 operating according to the a program loaded from the EEPROM 504 to the RAM 503.

The transmission/reception unit 91 communicates, or exchanges data, with another terminal (device) via the communication network 100.

The reception unit 92 receives an operation of a person (for example, a user Y).

The display control unit 94 displays various images on the display 518 of the user terminal 9.

The sound output control unit 95 performs control to output sound to the speaker 516 of the user terminal 9.

Process or Operation of Communication System

Processes or operations of the communication system is described below with reference to FIGS. 20 to 28.

Login Process

Figure 20:
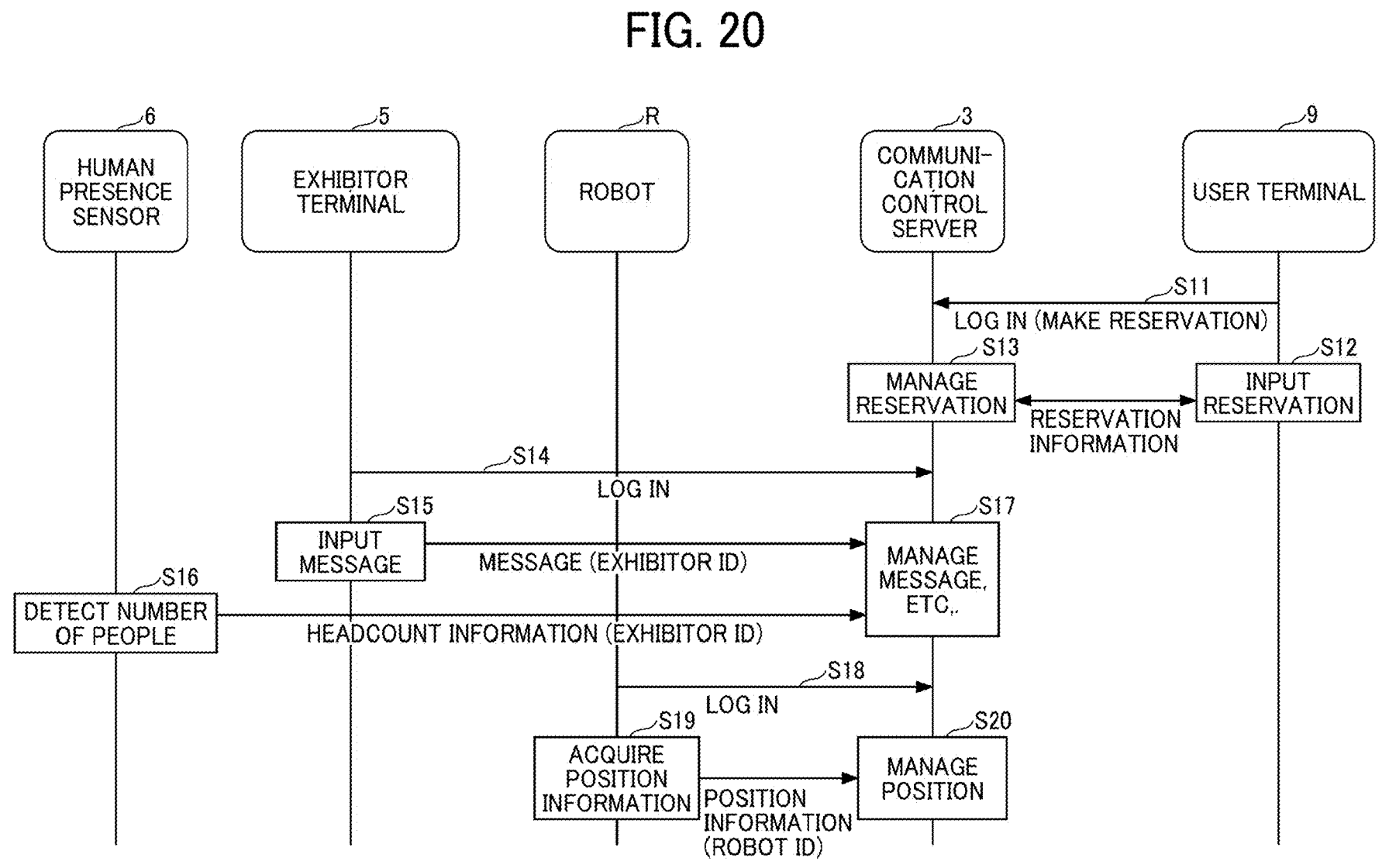

Reserving the robot R, managing the situation of the booth, and managing the position of the robot R in the real space are described with reference to FIGS. 20 and 21. FIG. 20 is a sequence diagram illustrating, a process for, for example, reserving a robot, managing a situation of a booth, and managing a position of a robot in a real space.

Step S11: As illustrated in FIG. 20, the transmission/reception unit 91 of the user terminal 9 performs login processing to log into the communication control server 3 for starting making a reservation for the robot R. In this case, the transmission/reception unit 91 transmits a user ID and a password received by the reception unit 92 to the communication control server 3. The authentication unit 33 of the communication control server 3 performs authentication by determining whether the same pair of the user ID and the password as the one received by the transmission/reception unit 31 is registered in advance in the user DB 41 (see FIG. 15). In the following, a case in which the user Y (a user Y1 in this case) is determined to be a valid user by authentication is described.

Step S12: The display control unit 94 displays a robot reservation screen 120 illustrated in FIG. 21 on the display 518 of the user terminal 9 based on data on the robot reservation screen sent from the communication control server 3. FIG. 21 is a diagram illustrating a robot reservation screen displayed on the user terminal according to the present embodiment. The image of the robot reservation screen 120 is an image created by the image generation unit 37 using the robot reservation DB 44 (see FIG. 18).

As illustrated in FIG. 21, a display area 121 for displaying a date on which a remote operation is performed, a reservation table 122 for robots, and a "CONFIRM" button 125 for confirming input reservation details are displayed on the robot reservation screen 120. When the user Y (the user Y1 in the example) selects a desired date, the reception unit 92 receives the selection, and the display control unit 94 displays the reservation table 122 for the date. When the user Y1 selects (specifies) a blank portion in the reservation time slots in the reservation table 122, the reception unit 92 receives the selection, and the display control unit 94 displays the user ID "Y091" of the user Y1. Finally, when the user Y1 presses the "CONFIRM" button 125, the reception unit 92 receives the reservation information, and the transmission/reception unit 91 transmits information indicating that the reservation information has been confirmed to the communication control server 3.

Step S13: The image generation unit 37 of the communication control server 3 manages the confirmed reservation details in the robot reservation DB (see FIG. 18).

Step S14: The transmission/reception unit 51 of the exhibitor terminal 5 performs login processing to log into the communication control server 3. In this case, the transmission/reception unit 51 transmits the exhibitor ID and the password received by the reception unit 52 to the communication control server 3. The authentication unit 33 of the communication control server 3 performs authentication by determining whether the same pair of exhibitor ID and the password as the one registered in advance in the exhibitor DB 42 (see FIG. 16) has been received by the transmission/reception unit 31. In the following, a case in which the exhibitor E (an exhibitor E1 in this case) is determined to be a valid exhibitor by authentication is described.

Step S15: When the exhibitor E1 inputs a message to the exhibitor terminal 5 at predetermined time intervals (for example, 30 minutes) or irregularly, the reception unit 52 receives the input of the message, and the transmission/reception unit 51 transmits the message to the communication control server 3. The message includes the exhibitor ID of the exhibitor E1 that is the transmission source. Accordingly, the transmission/reception unit 31 of the communication control server 3 receives the message. The message includes, for example, the congestion situation of a booth A used by the exhibitor E1, a time slot in which an event, such as a demonstration starts, and is finally displayed in a display area 170 illustrated in FIG. 23, which is described later.

Step S16: The human presence sensor 6 detects the number of people inside and around the booth (the booth A of the exhibitor E1 in the example) in which the human presence sensor 6 is installed, and transmits headcount information indicating the detected number of people to the communication control server 3, at predetermined time intervals (for example, every minute). The headcount information includes the exhibitor ID of the exhibitor E1 set in the human presence sensor 6 in advance. Accordingly, the transmission/reception unit 31 of the communication control server 3 receives the headcount information.

Step S17: In the communication control server 3, the calculation unit 35 stores the message received in the processing of Step S15 in the exhibitor DB 42 (see FIG. 16), more specifically, in the field of "MESSAGE FROM EXHIBITOR" of a record that includes the exhibitor ID received by the transmission/reception unit 31, and overwrites and saves the headcount information (Level) received in the processing of Step S16 in the field of "BOOTH CONGESTION LEVEL." In this case, the calculation unit 35 calculates the mean value of the congestion levels in the booths for each exhibition area and overwrites and saves the numerical value in the field of "AREA CONGESTION LEVEL."

Step S18: The transmission/reception unit 71 of the robot R performs login processing to log into the communication control server 3 by an operation of, for example, the administrator of the exhibition hall. In this case, the transmission/reception unit 71 transmits the robot ID and the password received by the reception unit 72 to the communication control server 3. The authentication unit 33 of the communication control server 3 performs authentication by determining whether the same pair of robot ID and the password as the one registered in advance in the robot position DB 43 (see FIG. 17) has been received by the transmission/reception unit 31. In the following, a case in which the robot R is determined to be a valid robot by authentication is described.

Step S19: The robot R acquires position information indicating the latest position of the robot R in the real space at predetermined time intervals (for example, every second), and transmits the position information to the communication control server 3. The position information includes the robot ID of the robot R that is the transmission source. Accordingly, the transmission/reception unit 31 of the communication control server 3 receives the position information.

Step S20: In the communication control server 3, the setting unit 36 overwrites and saves the information on the position in the real space received in the processing of Step S19 in the robot position DB 43 (see FIG. 17), more specifically in the field of "LATEST POSITION IN REAL SPACE" of a record that includes the robot ID received by the transmission/reception unit 31. In this case, the setting unit 36 obtains information on a position in the virtual space corresponding to the information on the position in the real space received in the processing of Step S19 based on the matching information, and overwrites and saves the information on the position in the virtual space in the field of "LATEST POSITION IN VIRTUAL SPACE" of the record to set the position information. The setting unit 36 stores and sets the information on the position in the virtual space corresponding to the information on the position in the real space received in the processing of Step S19 in the field of "LATEST POSITION IN VIRTUAL SPACE" of the record including the robot ID and the password. Further, the setting unit 36 stores and sets, in the field of "LATEST POSITION IN VIRTUAL SPACE" of the record including the login ID and the password used for the authentication of the processing of Step S18, virtual space (device) position information indicating an initial position.

Starting Remote Operation

Figure 22:
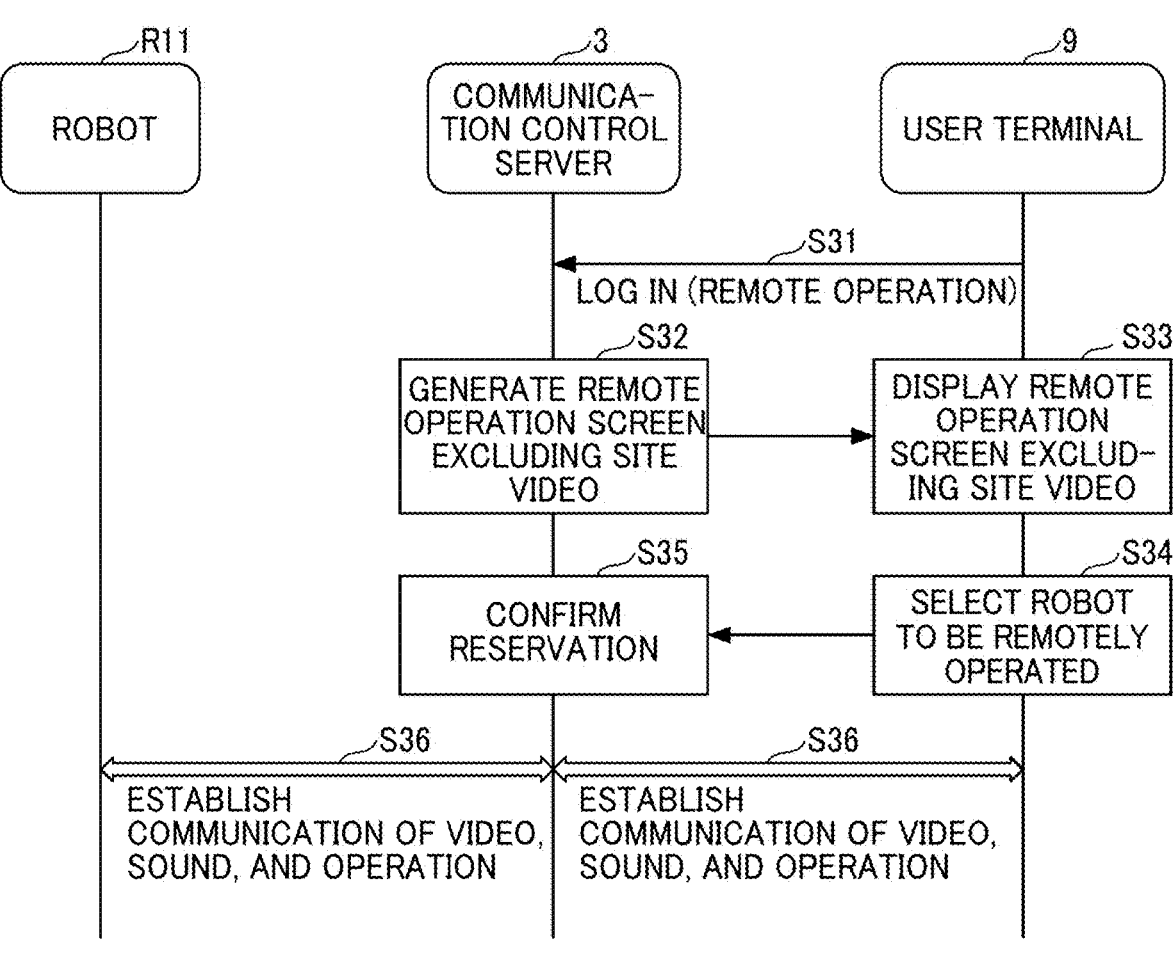
FIG. 22 is a sequence diagram illustrating a process for starting remote operation of a robot by a user terminal according to some embodiments of the present disclosure.
Figure 24:
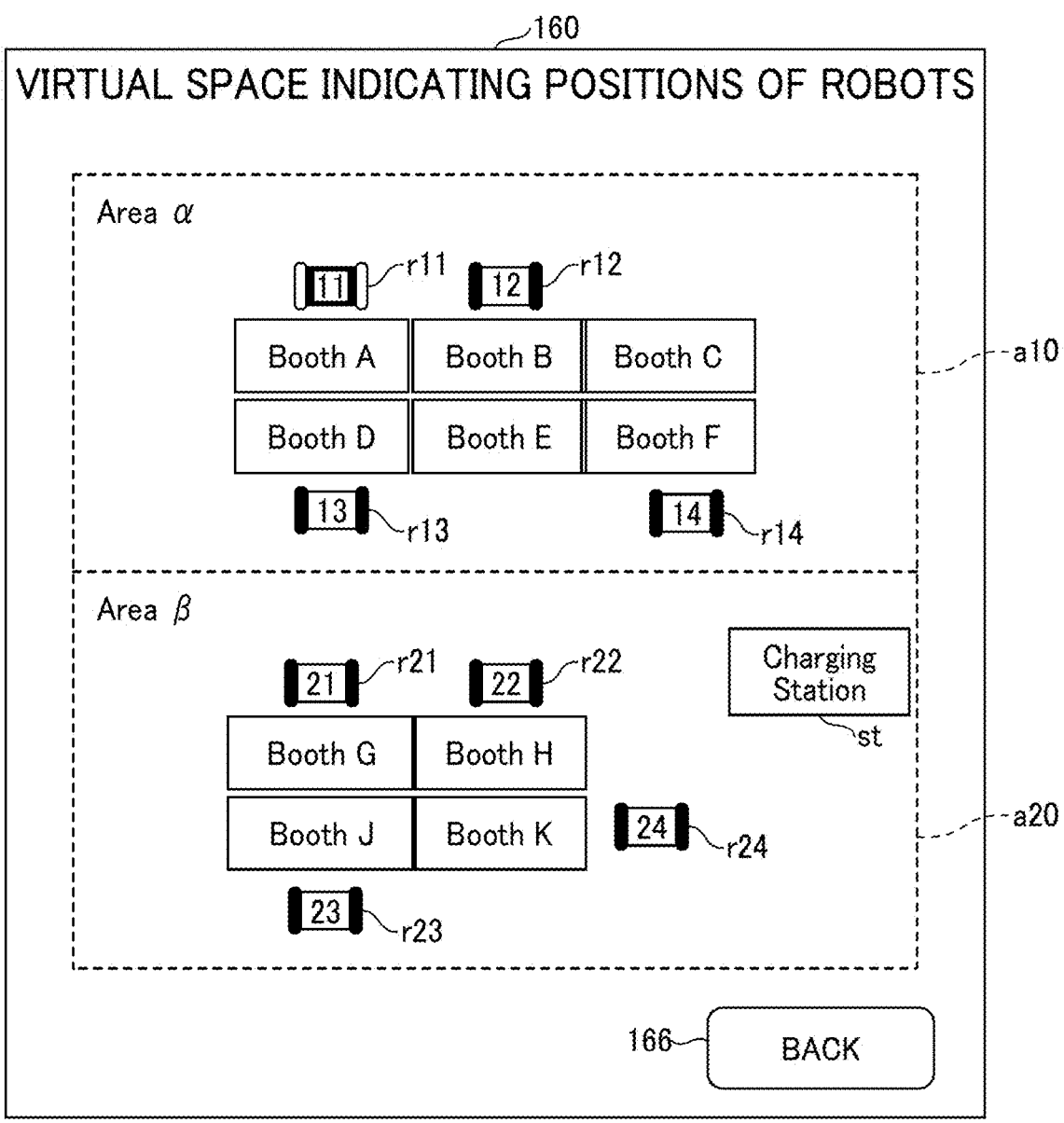
FIG. 24 is an enlarged view of a virtual space screen indicating positions of robots in an initial state according to some embodiments of the present disclosure.

A process for starting remote operation of the robot R (the robot R11 in this case) by the user terminal 9 is described below with reference to FIGS. 22 and 24. FIG. 22 is a sequence diagram illustrating a process for starting remote operation of a robot by a user terminal according to the present embodiment.

Step S31: As illustrated in FIG. 22, the transmission/reception unit 91 of the user terminal 9 performs login processing to log into the communication control server 3 for starting remote operation of the robot R11. In this case, the transmission/reception unit 91 transmits a user ID and a password received by the reception unit 92 to the communication control server 3. The authentication unit 33 of the communication control server 3 performs authentication by determining whether the same pair of the user ID and the password as the one received by the transmission/reception unit 31 is registered in advance in the user DB 41 (see FIG. 15). In the following, a case in which the user Y1 is determined to be a valid user by authentication is described.

Step S32: The image generation unit 37 of the communication control server 3 pastes information other than a site video on a template of a remote operation screen generated in advance every predetermined time (for example, 1/60 seconds), and generates an image of a remote operation screen 140 illustrated in FIG. 23, which is described later. In this case, the image generation unit 37 reads the icon image of each robot R and the position information indicating the latest position in the virtual space from the robot position DB 43 (see FIG. 17), and forms a display area 160, which is described later. The image generation unit 37 reads each message registered in the column of "MESSAGE FROM EXHIBITOR" in the exhibitor DB 42 (see FIG. 16) and forms the display area 170, which is described later. Then, the transmission/reception unit 31 transmits data on the remote operation screen to the user terminal 9 every time the remote operation screen is generated by the image generation unit 37. Accordingly, the transmission/reception unit 91 of the user terminal 9 receives the data on the remote operation screen every predetermined time (for example, 1/60 seconds).

Step S33: The display control unit 94 of the user terminal 9 displays the remote operation screen 140 as illustrated in FIG. 23 on the display 518 of the user terminal 9. The remote operation screen 140 displays the display area 150 for displaying a site video from the robot R remotely operated, the display area 160 for displaying a virtual space indicating the positions of the robots, the display area 170 for displaying one or more messages, and an operation button group 180 including various operation buttons. At this time, since the communication between the user terminal 9 and the robot R is not established, no image is displayed in the display area 150.

In the display area 160, a schematic diagram of the exhibition hall in the real space is displayed, and icons representing the robots R are also displayed. Further, an "ENLARGE" button 165 for enlarging the display area 160 is also displayed in the display area 160. At this time, since the robot to be remotely operated is not selected, all the icons of the robots R are displayed with frames of each of which the inside is white.

The display area 170 displays the content of a message transmitted from the exhibitor terminal 5 to the communication control server 3.

The operation button group 180 includes a button allowing the user Y to remotely operate the robot R to move (including rotation). In this case, a button for rotating right, a button for moving forward, a button for moving backward, a button for rotating left, a button for enlarging of imaging by the imaging device, and a button for reducing of imaging by the imaging device are displayed from the left to the right.

Step S34: Returning to FIG. 22, when the user Y1 presses the "ENLARGE" button 165, the reception unit 92 receives an instruction for enlarging display, and the display control unit 94 enlarges and displays the display area 160 as illustrated in FIG. 24. In this step, when the user Y1 selects a robot icon r11 of the robot r11, the reception unit 92 receives the selection of the robot r11 to be remotely operated. Then, the transmission/reception unit 91 transmits to the communication control server 3 information indicating that the robot R11 has been selected. This information includes the user ID "Y091" of the user Y1 and the robot ID "R011" of the robot R11. Accordingly, the transmission/reception unit 31 of the communication control server 3 receives the information indicating that the robot R11 has been selected by the user Y1. Further, when the user Y1 finishes selecting the robot R11 and presses a "BACK" button 166, the reception unit 92 receives an instruction to return to the remote operation screen 140 of FIG. 23, and the display control unit 94 displays the remote operation screen 140 again.

Step S35: The communication control unit 32 searches the robot reservation DB 44 (see FIG. 18) using the robot ID "R011" received in Step S34 as a search key, and thereby confirms whether the user ID "Y091" is registered in the current time slot. When the user ID "Y091" is registered in the current time slot, the setting unit 36 sets (registers) the user ID "Y091" in the field of "USER ID OF USER REMOTELY OPERATING" of a record that includes the robot ID "R011" in the robot position DB 43 (see FIG. 17). After that, when the communication destination of the user terminal 9 of the predetermined user having the user ID "Y091" is switched to another robot, the setting unit 36 changes the storing destination of the user ID "Y091" to the field of "USER ID OF USER REMOTELY OPERATING" of a record for the robot that is the switching destination. In the following description, a case in which the user ID "Y091" is registered in the current time slot, and the user ID "Y091" is set (registered) in the field of "USER ID OF"

USER REMOTELY OPERATING" of the record for the robot ID "R011" in the robot position DB 43 (see FIG. 17) is given.

Step S36: The communication control unit 32 establishes communication (video, sound, operation) between the user terminal 9 and the robot R11. Accordingly, as illustrated in FIG. 23, the display control unit 94 can display a video captured by the robot R11 on the display area 150.

Switching Robots

Figure 25:
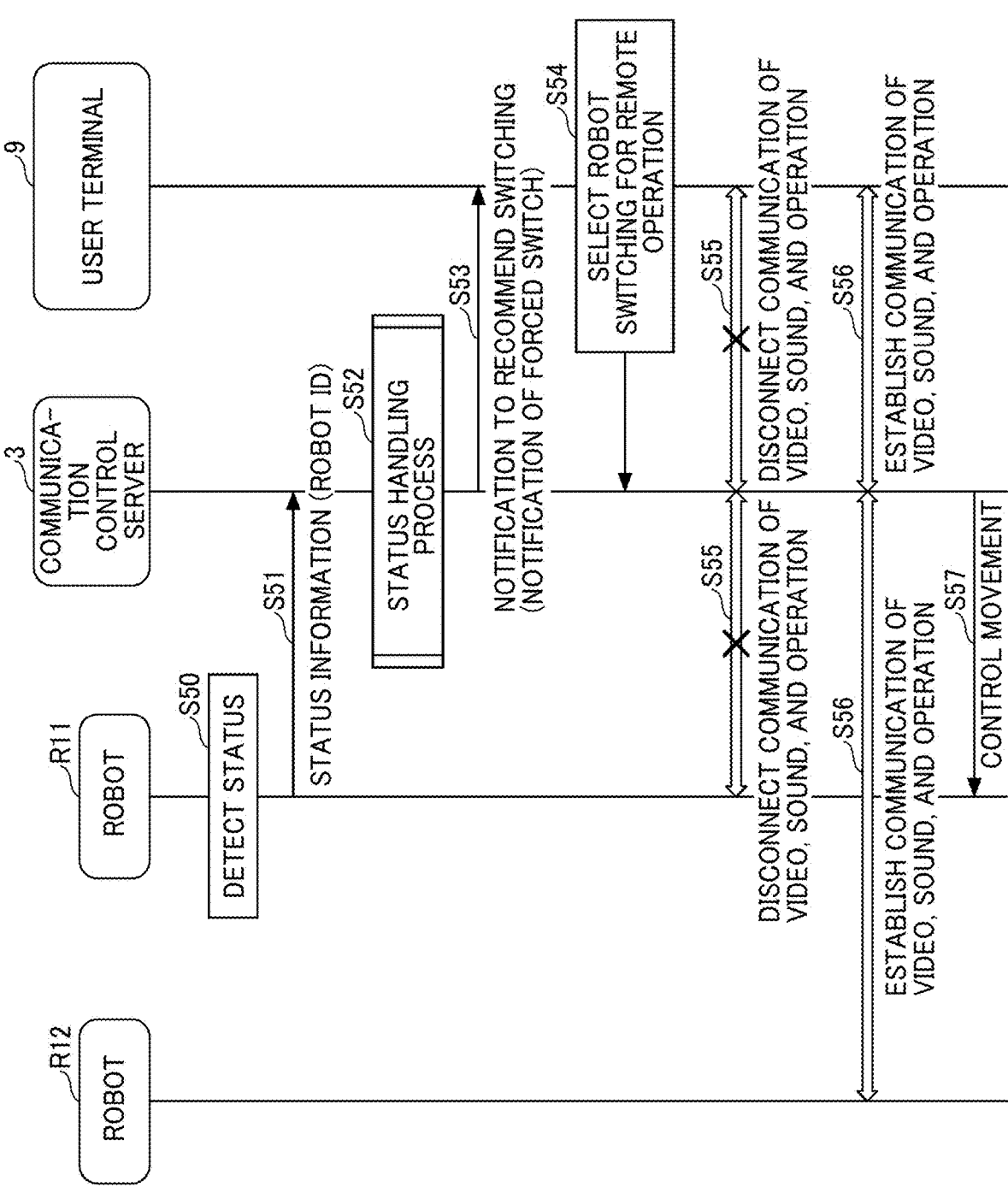
FIG. 25 is a sequence diagram illustrating a process for switching robots to be remotely operated according to some embodiments of the present disclosure.

A process for switching the communication (communication destination) of the user terminal 9 from the robot R11 to the robot R12 is described with reference to FIGS. 25 to 28. FIG. 25 is a sequence diagram illustrating a process for switching robots to be remotely operated according to the present embodiment.

Step S50: As illustrated in FIG. 25, in the robot R11, the status detection unit 78 detects the status (for example, the amount of battery remaining) of the robot R11, which is the self-included device, at predetermined time intervals (for example, every minute).

Step S51: The transmission/reception unit 71 of the robot R11 transmits status information indicating the status detected by the status detection unit 78 to the communication control server 3. The status information includes the robot ID "R011" for identifying the robot R11. Accordingly, the transmission/reception unit 31 of the communication control server 3 receives the status information and updates the record for the robot ID "R011" in the robot performance/ status DB 45" (see FIG. 19). In FIG. 19, since the fields of "TYPE OF IMAGING DEVICE" and "MAXIMUM MOVEMENT SPEED" are stored in advance, the fields of "AMOUNT OF BATTERY REMAINING," "COMMUNICATION STATUS," "TOTAL OPERATION TIME," and "MALFUNCTION STATUS" are rewritten.

Figure 26:
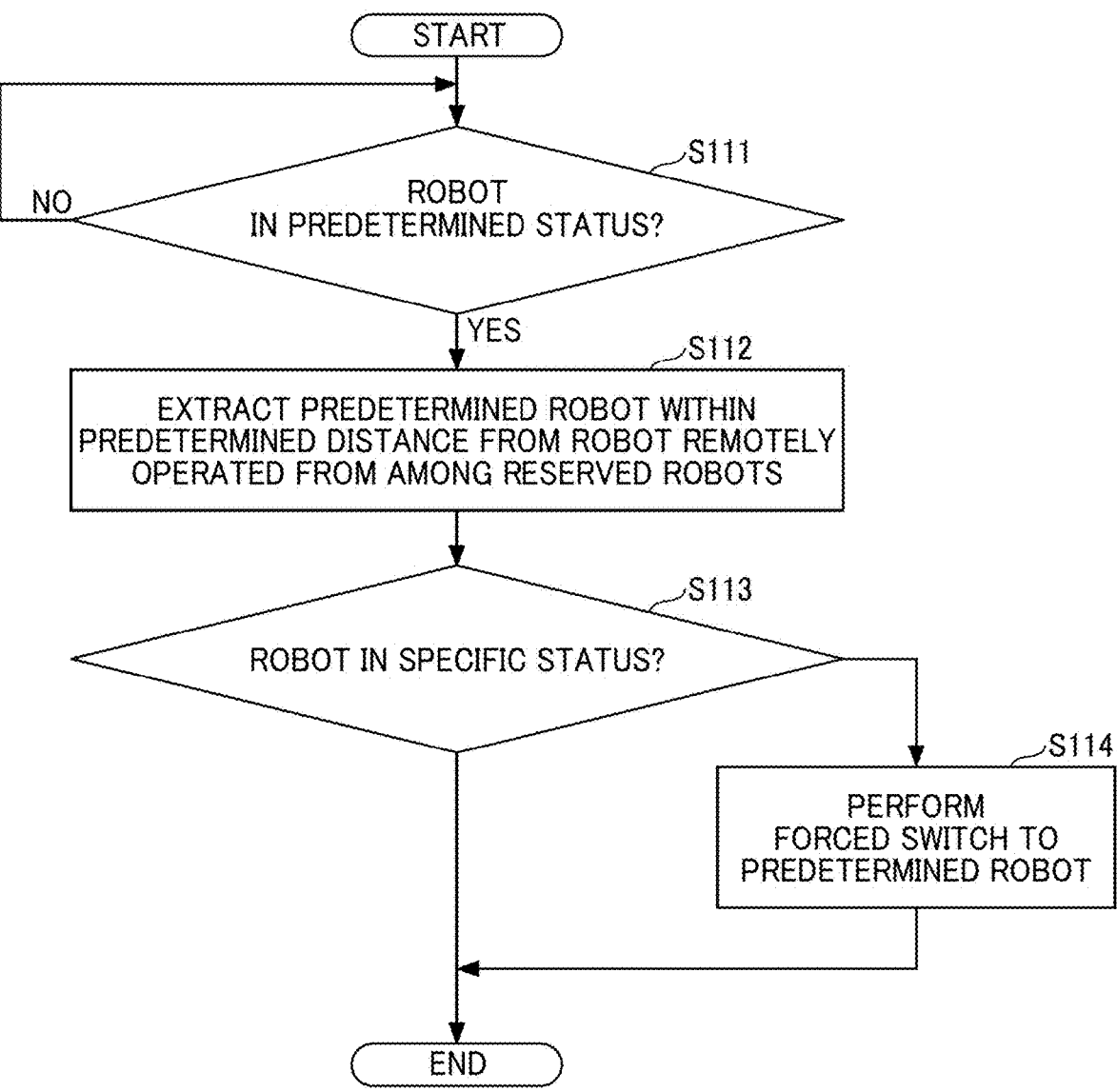
FIG. 26 is a flowchart of a status handling process according to some embodiments of the present disclosure.

Step S52: The communication control server 3 performs a status handling process based on the status information received in the process Step S51. The status handling process is described below in detail with reference to FIG. 26. FIG. 26 is a flowchart of a status handling process according to the present embodiment.

Step S111: The status determination unit 38 determines whether a malfunction has occurred in the robot R11 and the robot R11 is in a predetermined status based on the status information received in the processing of Step S51.

When the robot R11 is not in the predetermined status (S111; NO), the processing of Step S111 is repeated.

Step S112: When the robot R11 is in the predetermined status (S111: YES), the status determination unit 38 searches the robot position DB 43 (see FIG. 17) using the robot ID "R011" received in the processing of Step S51 as a search key, and reads the corresponding user ID "Y091" of the user who is performing the remote operation. Subsequently, the status determination unit 38 searches the robot reservation DB 44 (see FIG. 18) using the user ID "Y091" as a search key, and reads the robot IDs "R011," "R012," and "R013" that are the IDs of all the robots reserved by the user Y1 for the current time. Subsequently, the status determination unit 38 searches the robot position DB 43 using the read robot IDs "R011," "R012," and "R013" as search keys, and reads the position information indicating the latest position in the real space for the robots R11, R12, and R13.

Then, the status determination unit 38 calculates distances between the latest position in the real space of the robot R011 corresponding to the robot ID "R11" received in the processing of Step S51 and each of the latest positions in the real space of the robots R12 and R13 corresponding to the robot IDs "R012" and "R013," respectively, and extracts the robot ID ("R012" in this case) of predetermined robot within a predetermined distance (predetermined range) from the position of the robot R11. This is a first method.

As a second method, the status determination unit 38 may search the robot performance/status DB 45 (see FIG. 19) using the read robot IDs "R012" and "R013" as search keys without considering the position in the real space, read the performance (the type of the imaging device and the maximum movement speed) of the corresponding robot R, and extract the robot ID "R012" associated with predetermined performance (at least one of "FULL-SPHERE CAPTURE" and "MAXIMUM MOVING SPEED, LEVEL 3" in this case) that are the same as the robot R11 corresponding to the robot ID "R011" received in the processing of Step S51.

As a third method, the status determination unit 38 may search the robot performance/status DB 45 (see FIG. 19) using the read robot IDs "R012" and "R013" as search keys without considering the position in the real space, read the status (amount of battery remaining, communication status, total operation time, and malfunction status) of the corresponding robots R, and extract the robot ID "R012" satisfying a status condition including the following four conditions (or satisfying the conditions except for the one corresponding to "TOTAL OPERATION TIME"). The status condition includes, for example, as follows.

AMOUNT OF BATTERY REMAINING: 50% or more (reference amount or more)

COMMUNICATION STATUS: Level 4 or more (reference communication speed or more)

TOTAL OPERATION TIME: Less than 500 minutes-

MALFUNCTION STATUS: Level 0 (proper operational status)

Further, as a fourth method, the status determination unit 38 collates the latest positions of the read robot IDs "R012" and "R013" in the real space with map information stored in the storage unit 40 in advance, and specifies the predetermined booths in which the robots R12 and R13 are located. The map information is information indicating a relationship between a position (coordinates) in the real space and a booth. The status determination unit 38 may read situation information (congestion level) indicating the congestion situation of the predetermined booth from the exhibitor DB 42 (see FIG. 16) and narrow down the robot ID to the robot IDs "R012" at the position at which the congestion level is less than a predetermined level. The congestion level less than the predetermined level is, for example, less than "Level 5." Further, the status determination unit 38 may specify the congestion situation of the predetermined booth by extracting words (text) indicating the congestion situation by performing natural language processing on the message in the field of "MESSAGE FROM EXHIBITOR" in the exhibitor DB 42.

Further, the status determination unit 38 may extract the robot ID of a robot R that satisfies at least two conditions from among the predetermined distance, the predetermined performance, the status condition, and the situation information as a robot R to be the switching destination.

Step S113: Further, the status determination unit 38 determines whether the robot R11 is in a specific status in which the robot 11 is in a status worse than the predetermined status, based on the status information received in the processing of Step S51.

When the robot R11 is in the predetermined status but has not entered in the specific status (S113; NO), the status handling process illustrated in FIG. 26 ends.

Step S114: When the robot R11 is in the specific status (S113: YES), the communication control unit 32 serving as a switching unit forcibly switches the communication with the user terminal 9 from the robot R11 to the predetermined robot (the robot R12 in this case) that is extracted in the processing of Step S112 (see Step S55 and Step S56). Accordingly, the status handling process of FIG. 26 ends.

Step S53: Returning to FIG. 25, the transmission/reception unit 31 transmits the user terminal 9 identified by the user ID "Y091" read by the processing of Step S52 a notification for a recommendation for switch to prompt the user terminal 9 to switch the communication (communication destination) from the robot R11 to the robot R12. Accordingly, transmission/reception unit 91 of the user terminal 9 receives the notification for the recommendation for switch.

Figure 27:
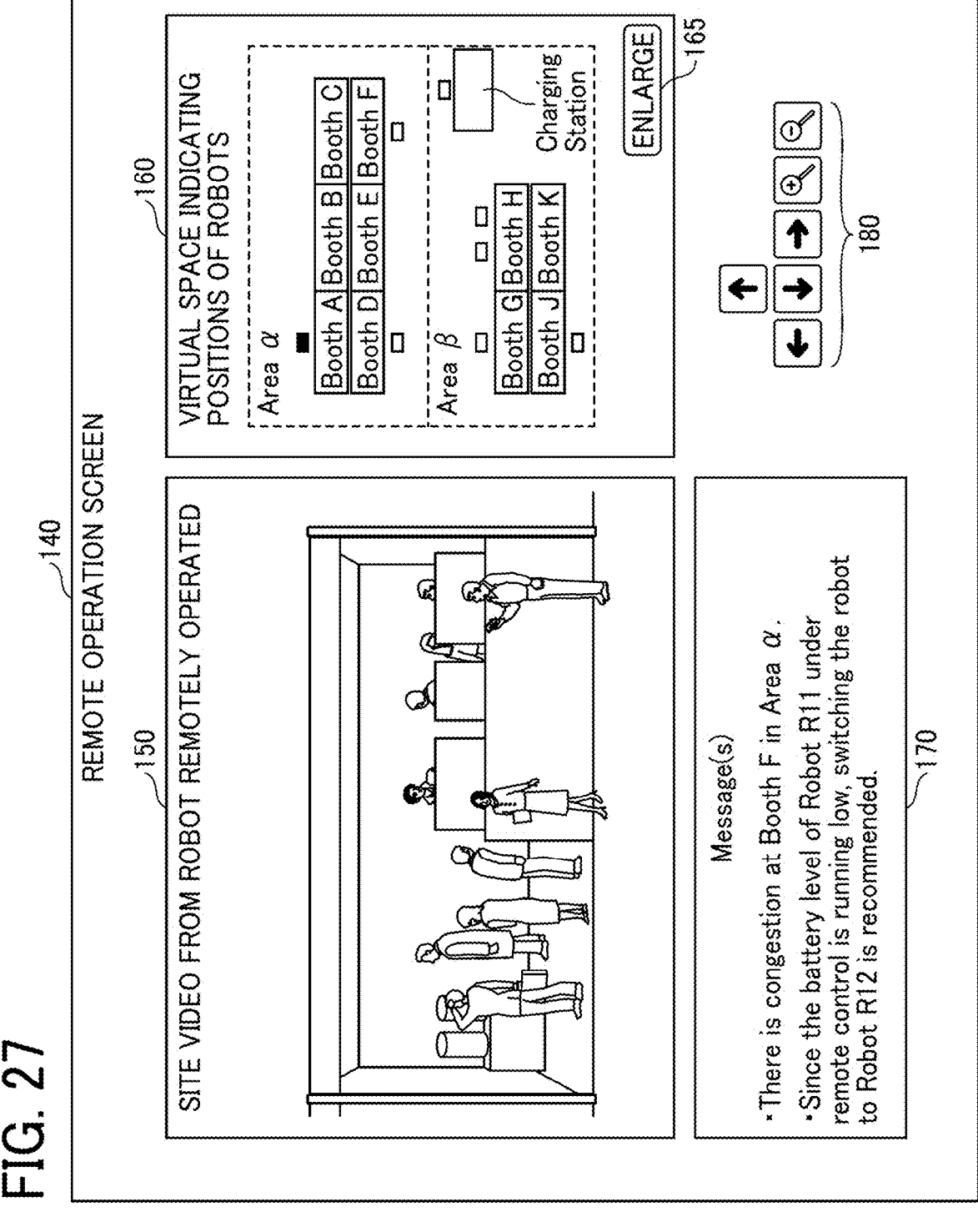
FIG. 27 is a diagram illustrating a remote operation screen displayed on a user terminal according to some embodiments of the present disclosure.

Step S54: The display control unit 94 of the user terminal 9, displays a message about the recommendation for switch in the display area 170 for messages as illustrated in FIG. 27 based on the notification for the recommendation for switch received in the processing of Step S53. FIG. 27 is a diagram illustrating a remote operation screen displayed on a user terminal according to the present embodiment. In FIG. 27, for example, a message, "Since the battery level of Robot R11 under remote control is running low, switching the robot to Robot R12 is recommended." is additionally displayed. At this time, when the user Y1 presses the "ENLARGE" button 165, the reception unit 92 receives an enlargement instruction, and the display control unit 94 displays the display area 160 for the robot positions as illustrated in FIG. 24 on the display 518 of the user terminal 9. Then, when the user Y1 selects the robot icon r12 in accordance with the message about the recommendation for switch, the reception unit 92 receives the selection for switching to the robot R12. In other words, the reception unit 92 receives a user operation for accepting the recommendation. The transmission/reception unit 91 then transmits to the communication control server 3 a response indicating an intention to switch to the robot R12 (including the robot ID "R012"). In other words, the response transmitted by the transmission/reception unit 91 indicates acceptance of the recommendation. Accordingly, the communication control server 3 receives the response indicating the intention to switch to the robot R12, namely the response indicating the acceptance of the recommendation.

Step S55: The communication control unit 32 serving as a switching unit disconnects the communication (video, sound, operation) between the user terminal 9 and the robot R11 based on the response that indicates the intention to switch to the robot R12 and that is received in the processing of Step S54.

Figure 28:
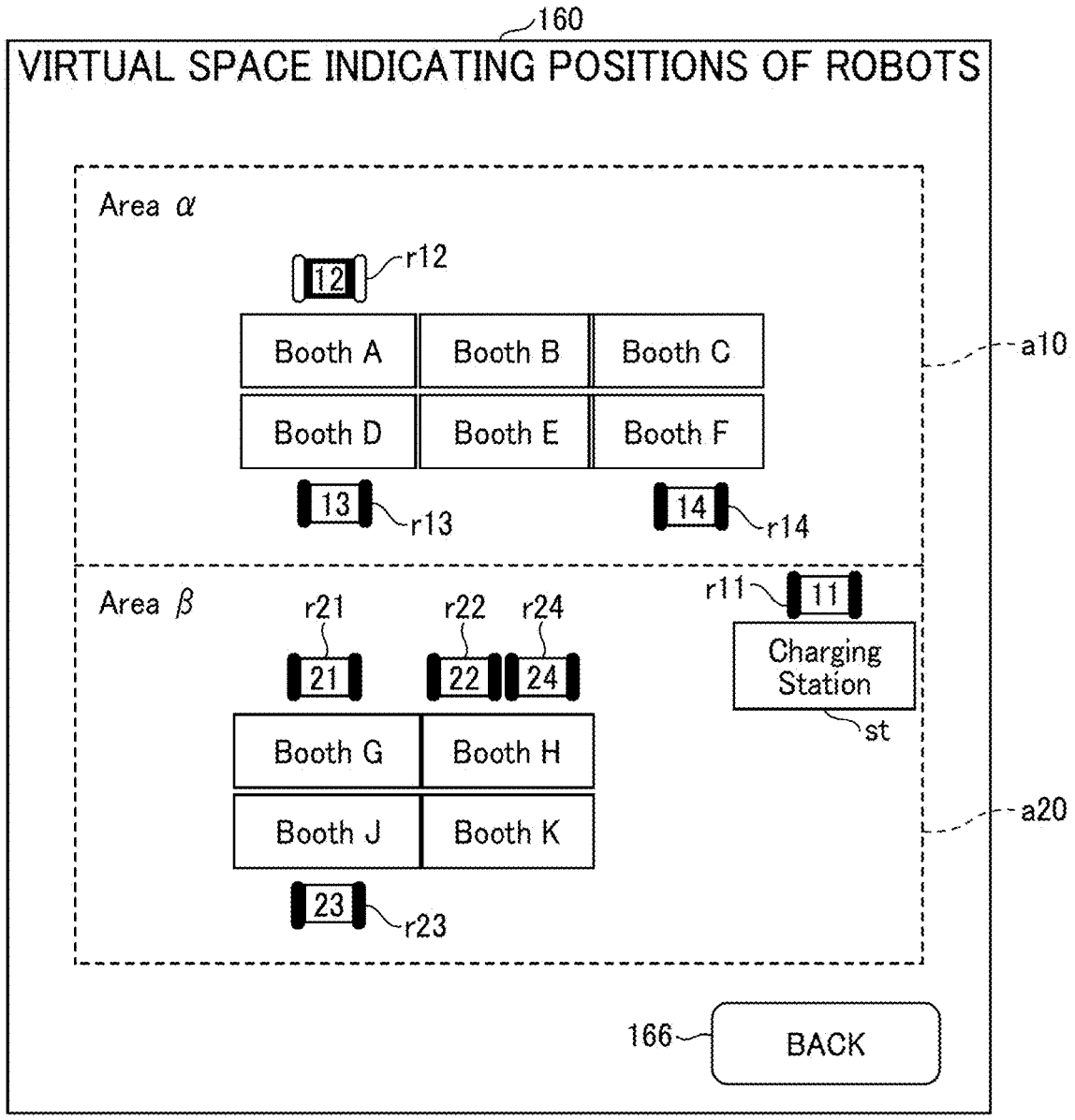
FIG. 28 is an enlarged view of a virtual space screen indicating positions of robots after switching of robots to be remotely operated according to some embodiments of the present disclosure.

Step S56: The communication control unit 32 serving as a switching unit establishes a connection or communication (video, sound, operation) between the user terminal 9 and the robot R12 based on the response that indicates the intention to switch to the robot R12 and that is received in the processing of Step S54. Accordingly, based on the data of the remote operation screen from the communication control server 3, the display control unit 94 of the user terminal 9 changes the display mode of the robot icon r12 of the robot R12 to the one indicating "operating" after the switching and changes the display mode of the robot icon r11 of the robot R11 to the other one indicating "not operating" as illustrated in FIG. 28. Accordingly, the user Y1 can know that the user Y1 is currently operating the robot R12. The display control unit 94 may display the icons of the robots that are selectable by the user Y1 at this time point in the display area 160 of FIG. 24 without displaying an icon of a robot that is not selectable, based on the data of the remote operation screen from the communication control server 3.

Step S57: Returning to FIG. 25, in the communication control server 3, when the amount of battery remaining of the robot R11 is determined to be less than the first remaining amount (remaining-amount threshold) by the processing of Step S111, or when the amount of battery remaining of the robot R11 is determined to be less than the second remaining amount (another remaining-amount threshold) by the processing of Step S133, the transmission/reception unit 31 provides to the robot R11 an instruction for movement control to cause the robot R11 to move to the charging station st positioned at a position determined in advance. Since the instruction for movement control includes position information indicating the position of the charging station st in the real space, the robot R11 arrives at the charging station st by autonomous traveling while operating the GPS receiver 511. In FIG. 28, where the robot icon r11 is indicates that the robot R11 has arrived at the charging station st. FIG. 28 is an enlarged view of the virtual space screen indicating the positions of the robots after switching of the robots to be remotely operated according to the present embodiment of the disclosure.

As described above, according to the present embodiment, the communication control unit 32 of the communication control server 3 serving as a switching unit performs control to switch the communication (communication destination) of the user terminal 9 from the robot R11 to the robot R12 based on the status being in a predetermined status (for example, the amount of battery remaining is less than 30%) of the robot R11, which is being remotely operated by the user terminal 9. This allows the user Y1 to virtually move in the exhibition hall while continuing to remotely operate the robot R12, and view the exhibition contents of each exhibitor, even when the robot R11 is in the predetermined status during the remote operation.

Further, in the communication control server 3, before the communication control unit 32 switches the communication, the transmission/reception unit 31 serving as a recommendation unit provides a recommendation to the user terminal 9 to switch the communication (communication destination) of the user terminal 9 from the robot R11 to the robot R12. This allows the user Y1 to switch to the robot R12 with his or her awareness.

Further, when the status of the robot R11 being remotely operated by the user terminal 9 is in a specific status that is worse than a predetermined status, the communication control unit 32 serving as a switching unit forcibly switches the communication (communication destination) of the user terminal 9 from the robot R11 to the robot R12 without the transmission/reception unit 31 providing a recommendation to the user terminal 9 before the robot R11 stops (see Step S55 and Step S56). Then, the transmission/reception unit 31 notifies the user terminal 9 that the forced switching has been performed. This can prevent the user Y1 from suddenly losing remote operation of the robot R11. Further, the communication control server 3 can control the robot R11 to move to the charging station st while the robot R11 has power to move.

In the extraction (selection) of the robot R to be switched from the robot R11, by switching (or recommending to switch) the robot R11 to the robot R that satisfies at least one of four methods (conditions): (first method) located within a predetermined range from the robot R11; (second method) having predetermined performance same as or similar to the robot R11 (for example, full-sphere images can be captured);

(third method) satisfying a status condition (for example, the amount of battery remaining is half or more); and (fourth method) located in an uncongested booth (a booth that is not crowded with people). Accordingly, the robot R12 with operational stability can be switched so that the robot R12 operates steadily after the switching. Accordingly, the user Y can remotely operate the robot R12 without anxiety after the switching.

The present disclosure is applicable not only to exhibitions but also to visits to, for example, large showrooms, factories, schools, and companies. Further, the present disclosure is applicable to appreciation of exhibition facilities such as a museum, an aquarium, and a science museum. Further, the present disclosure is applicable to, for example, shopping at a large scale commercial facility such as a roadside station and a shopping mall.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Further, any of the above-described programs may be stored in a (non-transitory) recording medium for distribution.

Each of the CPU 301, the CPU 501, the CPU 811, or the CPU 1001 serving as a processor may be a single device or multiple devices.

However, in the related art, a first mobile apparatus such as a first robot is switched to a second mobile apparatus such as a second robot by taking into consideration of the position of the first mobile apparatus, but mobile apparatuses to be remotely operated are not switched from one another by taking into consideration of the statuses of the mobile apparatuses.

According to one or more aspects of the present disclosure, mobile apparatuses to be remotely operated can be switched by taking into consideration of the statuses of the mobile apparatuses.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A communication control server, comprising circuitry configured to:

receive, from a first mobile apparatus, status information indicating a status of the first mobile apparatus currently communicating with a communication terminal as a communication destination of the communication terminal, the first mobile apparatus being movable in a real space and remotely operable by the communication terminal; and switch the communication destination of the communication terminal from the first mobile apparatus to a second mobile apparatus based on the status information, the second mobile apparatus being movable in the real space and remotely operable by the communication terminal, wherein, in a case that the status information indicates that the status of the first mobile apparatus is a predetermined status, the circuitry is further configured to:

provide, to the communication terminal, a recommendation to switch the communication destination of the communication terminal from the first mobile apparatus to the second mobile apparatus; and switch the communication destination of the communication terminal from the first mobile apparatus to the second mobile apparatus based on a response from the communication terminal, the response indicating acceptance of the recommendation.

2. The communication control server of claim 1, wherein the predetermined status is at least one of:

a status in which an amount of battery remaining of the first mobile apparatus is less than a remaining-amount threshold;

a status in which a communication speed of the first mobile apparatus is less than a communication-speed threshold;

a status in which a total operation time from last maintenance of the first mobile apparatus is equal to or longer than a time threshold; or a status in which a predetermined malfunction occurs in the first mobile apparatus.

3. The communication control server of claim 2, wherein, in a case that the status information indicates that the status of the first mobile apparatus is a specific status that is worse than the predetermined status, the circuitry is further configured to forcibly switch the communication destination of the communication terminal from the first mobile apparatus to the second mobile apparatus without providing the recommendation to the communication terminal.

4. The communication control server of claim 3, wherein the specific status is at least one of:

a status in which the amount of battery remaining of the first mobile apparatus is less than another remaining-amount threshold that is less than the remaining-amount threshold;

a status in which the communication speed of the first mobile apparatus is less than another communication-speed threshold that is less than the communication-speed threshold;

a status in which the total operation time from the last maintenance of the first mobile apparatus is equal to or longer than another time threshold that is longer than the time threshold; or a status in which another predetermined malfunction that is worse than the predetermined malfunction occurs in the first mobile apparatus.

5. The communication control server of claim 4, wherein, in a case that the specific status of the first mobile apparatus is the status in which the amount of battery remaining of the first mobile apparatus is less than the another remaining-amount threshold, the circuitry is further configured to transmit, to the first mobile apparatus, an instruction to move to a charging station, after switching the communication destination of the communication terminal to the second mobile apparatus.

6. The communication control server of claim 1, wherein the circuitry is further configured to:

receive, from the first mobile apparatus, position information indicating a position of the first mobile apparatus;

receive, from each of a plurality of mobile apparatuses including the second mobile apparatus, additional position information indicating a position of a corresponding one of the plurality of mobile apparatuses, each of the plurality of mobile apparatuses being movable in the real space and operable by the communication terminal; and switch the communication destination of the communication terminal from the first mobile apparatus to the second mobile apparatus based on the position information and the additional position information, the position information and the additional position information indicating that the position of the second mobile apparatus is within a predetermined distance from the position of the first mobile apparatus.

7. The communication control server of claim 1, wherein the circuitry is further configured to:

receive, from the first mobile apparatus, position information indicating a position of the first mobile apparatus;

receive, from each of a plurality of mobile apparatuses including the second mobile apparatus, additional position information indicating a position of a corresponding one of the plurality of mobile apparatuses, each of the plurality of mobile apparatuses being movable in the real space and operable by the communication terminal; and provide, to the communication terminal, the recommendation to switch the communication destination of the communication terminal from the first mobile apparatus to the second mobile apparatus based on the position information and the additional position information, the position information and the additional position information indicating that the position of the second mobile apparatus is within a predetermined distance from the position of the first mobile apparatus.

8. The communication control server of claim 1, wherein the circuitry is further configured to:

receive, from each of a plurality of mobile apparatuses including the second mobile apparatus, additional status information indicating a status of a corresponding one of the plurality of mobile apparatuses, each of the plurality of mobile apparatuses being movable in the real space and operable by the communication terminal; and switch the communication destination of the communication terminal from the first mobile apparatus to the second mobile apparatus based on the additional status information indicating that a status of the second mobile apparatus satisfies a status condition.

9. The communication control server of claim 8, wherein the status condition includes:

a status in which an amount of battery remaining of the second mobile apparatus is equal to or greater than a reference amount;

a status in which a communication speed is equal to or greater than a reference communication speed; and a proper operational status without a malfunction.

10. The communication control server of claim 1, wherein the circuitry is further configured to:

receive, from each of a plurality of mobile apparatuses including the second mobile apparatus, additional status information indicating a status of a corresponding one of the plurality of mobile apparatuses, each of the plurality of mobile apparatuses being movable in the real space and operable by the communication terminal; and provide, to the communication terminal, the recommendation to switch the communication destination of the communication terminal from the first mobile apparatus to the second mobile apparatus based on the additional status information indicating that a status of the second mobile apparatus satisfies a status condition.

11. The communication control server of claim 10, wherein the status condition includes:

a status in which an amount of battery remaining of the second mobile apparatus is equal to or greater than a reference amount;

a status in which a communication speed is equal to or greater than a reference communication speed; and a proper operational status without a malfunction.

12. The communication control server of claim 1, wherein the circuitry is further configured to:

store, in a memory, a performance of each of a plurality of mobile apparatuses including the first mobile apparatus and the second mobile apparatus, each of the plurality of mobile apparatuses being movable in the real space and operable by the communication terminal; and switch the communication destination of the communication terminal from the first mobile apparatus to the second mobile apparatus that has a predetermined performance the same as or similar to the first mobile apparatus, based on the performances stored in the memory.

13. The communication control server of claim 12, wherein the predetermined performance includes at least one of:

a type of an imaging device being the same as a type of imaging device of the first mobile apparatus; or a maximum movement speed being the same as a maximum movement speed of the first mobile apparatus.

14. The communication control server of claim 1, wherein the circuitry is further configured to:

receive, from each of a plurality of mobile apparatuses including the second mobile apparatus, position information indicating a position of a corresponding one of the plurality of mobile apparatuses, each of the plurality of mobile apparatuses being movable in the real space and operable by the communication terminal;

receive, from one of another communication terminal and a human presence sensor, situation information indicating a congestion situation; and switch the communication destination of the communication terminal from the first mobile apparatus to the second mobile apparatus based on the position information and the situation information, the position information and the situation information indicating that the congestion situation relating to a position of the second mobile apparatus is less than a predetermined level.

15. The communication control server of claim 14, wherein in a case that the status information indicates that the status of the first mobile apparatus is a predetermined status, the circuitry is further configured to:

provide, to the communication terminal, a recommendation to switch the communication destination of the communication terminal from the first mobile apparatus to the second mobile apparatus of which the position being in the congestion situation that is less than the predetermined level; and switch the communication destination of the communication terminal from the first mobile apparatus to the second mobile apparatus based on a response from the communication terminal, the response indicating acceptance of the recommendation.

16. The communication control server of claim 1, wherein the circuitry is further configured to:

store, in a memory, one or more reservations for operation of corresponding one or more of a plurality of mobile apparatuses including the first mobile apparatus and the second mobile apparatus, each of the plurality of mobile apparatuses being movable in the real space and operable by the communication terminal; and switch the communication destination of the communication terminal from the first mobile apparatus to the second mobile apparatus based on one of the one or more reservations, the one of the one or more reservations being a reservation with which the second mobile apparatus is remotely operable by the communication terminal.

17. The communication control server of claim 16, wherein, in a case that the status information indicates that the status of the first mobile apparatus is a predetermined status, the circuitry is further configured to:

provide, to the communication terminal, a recommendation to switch the communication destination of the communication terminal from the first mobile apparatus to the second mobile apparatus for which the one or more of reservations have been made; and switch the communication destination of the communication terminal from the first mobile apparatus to the second mobile apparatus based on a response from the communication terminal, the response indicating acceptance of the recommendation.

18. A communication system, comprising:

a first robot configured to move in a real space;

a second robot configured to move in the real space;

a communication terminal to remotely operate one of the first robot configured and the second robot configured; and a communication control server to control communication between the communication terminal and each of the first robot configured and the second robot configured, the communication control server including circuitry configured to:

receive, from the first robot configured, status information indicating a status of the first robot configured currently communicating with the communication terminal as a communication destination of the communication terminal; and switch the communication destination of the communication terminal from the first robot configured to the second robot configured based on the status information indicating that the status of the first robot configured is a predetermined status, wherein, in a case that the status information indicates that the status of the first robot is a predetermined status, the circuitry is further configured to:

provide, to the communication terminal, a recommendation to switch the communication destination of the communication terminal from the first robot to the second robot; and switch the communication destination of the communication terminal from the first robot to the second robot based on a response from the communication terminal, the response indicating acceptance of the recommendation.

19. A communication control method, comprising:

receiving, from a first mobile apparatus, status information indicating a status of the first mobile apparatus currently communicating with a communication terminal as a communication destination of the communication terminal, the first mobile apparatus being movable in a real space and remotely operable by the communication terminal; and switching the communication destination of the communication terminal from the first mobile apparatus to a second mobile apparatus based on the status information indicating that the status of the first mobile apparatus is a predetermined status, the second mobile apparatus being movable in the real space and remotely operable by the communication terminal, wherein, in a case that the status information indicates that the status of the first mobile apparatus is a predetermined status, the method further comprises:

providing, to the communication terminal, a recommendation to switch the communication destination of the communication terminal from the first mobile apparatus to the second mobile apparatus; and switching the communication destination of the communication terminal from the first mobile apparatus to the second mobile apparatus based on a response from the communication terminal, the response indicating acceptance of the recommendation.

* * * * *